(12) United States Patent
Hiwara et al.

(10) Patent No.: US 8,124,272 B2
(45) Date of Patent: Feb. 28, 2012

(54) POLYVINYL ACETAL RESIN VARNISH GELLING AGENT, NONAQUEOUS ELECTROLYTE SOLUTION, AND ELECTROCHEMICAL DEVICE

(75) Inventors: Akio Hiwara, Sodegaura (JP); Takashi Hayashi, Sodegaura (JP); Kuniyuki Takamatsu, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 1260 days.

(21) Appl. No.: 11/795,313

(22) PCT Filed: Jan. 14, 2005

(86) PCT No.: PCT/JP2005/000415
§ 371 (c)(1),
(2), (4) Date: Jul. 16, 2007

(87) PCT Pub. No.: WO2006/075392
PCT Pub. Date: Jul. 20, 2006

(65) Prior Publication Data
US 2008/0090145 A1      Apr. 17, 2008

(51) Int. Cl.
*H01M 6/04* (2006.01)
*H01M 6/14* (2006.01)
*H01M 6/18* (2006.01)

(52) U.S. Cl. ........ 429/188; 429/300; 429/303; 429/304; 429/306

(58) Field of Classification Search .................. 429/188, 429/300, 303, 304, 306
See application file for complete search history.

(56) References Cited

U.S. PATENT DOCUMENTS

| | | | |
|---|---|---|---|
| 3,985,574 A | 10/1976 | Feuillade et al. |
| 3,989,540 A | 11/1976 | Feuillade et al. |
| 6,235,066 B1 | 5/2001 | Inuzuka et al. |
| 6,533,964 B1 | 3/2003 | Hata et al. |
| 2004/0146786 A1 | 7/2004 | Sato et al. |

FOREIGN PATENT DOCUMENTS

| | | |
|---|---|---|
| CN | 1245593 A | 2/2000 |
| JP | 50-18938 A | 2/1975 |
| JP | 05-025213 A | 2/1993 |
| JP | 10-050141 A | 2/1998 |
| JP | 2001-064323 A | 3/2001 |
| JP | 2001-085065 A | 3/2001 |
| JP | 2001-200125 A | 7/2001 |
| JP | 2001-200126 A | 7/2001 |
| JP | 2001-250586 A | 9/2001 |
| JP | 2005-050808 A | 2/2005 |
| WO | WO 00/56780 A1 | 9/2000 |
| WO | WO 02/093679 A1 | 11/2002 |

OTHER PUBLICATIONS

Chen Zhengbing et al. "A Modified Polyvinyl Formal With Phosphoric Acid", Speciality Petrochemicals, Nov. 1998, pp. 4-7, 6th term.*

*Primary Examiner* — Helen O Conley

(74) *Attorney, Agent, or Firm* — Buchanan Ingersoll & Rooney PC

(57) ABSTRACT

A polyvinyl acetal resin varnish which is so low in stimulus property, toxicity, environment-polluting property, offensive odor, and inflammability that no problem is caused in practical use, and which is high in safety, low in viscosity, and thus favorable in workability, and an application of the polyvinyl acetal resin varnish are provided. As an organic solvent for dissolving the polyvinyl acetal resin, there is used a nonaqueous solvent, preferably carbonate ester, and more preferably a mixed solvent composed of cyclic carbonate ester and chain carbonate ester, into which the polyvinyl acetal resin is evenly dissolved regardless of its type, resulting in varnish which is high in safety and low in viscosity. Since the varnish has an action of gelling the organic solvent, the varnish can be used as a gelling agent in various applications.

3 Claims, No Drawings

POLYVINYL ACETAL RESIN VARNISH GELLING AGENT, NONAQUEOUS ELECTROLYTE SOLUTION, AND ELECTROCHEMICAL DEVICE

TECHNICAL FIELD

The present invention relates to a polyvinyl acetal resin varnish. The polyvinyl acetal resin varnish of the invention is useful as a material of coating a conductive body and as an adhesive for inorganic materials and organic materials, for example.

Further, the invention relates to applications of the polyvinyl acetal resin varnish, and in particular, a gelling agent for organic solvents containing the polyvinyl acetal resin varnish, and a nonaqueous electrolyte solution and an electrochemical device obtained by making a use of the polyvinyl acetal resin varnish.

BACKGROUND ART

The polyvinyl acetal resin is a generic term used to refer to resins obtained by acetalization of polyvinyl alcohol with aldehyde. The polyvinyl acetal resin is not only favorable in electrical insulating property and excellent in adhesiveness and chemical resistance, but also high in mechanical strength such as flexibility and abrasion resistance, and is therefore used as a coating material or an adhesive in a wide variety of applications. For example, the polyvinyl acetal resin is used as a varnish for enamel wire, a binder for electromagnetic tape, and an adhesive for converging glass fibers and carbon fibers, and furthermore is widely used as a coating material or an adhesive in buildings, aircrafts, and the like constructions. In the case of using the polyvinyl acetal resin in the applications stated above, it is desired that the polyvinyl acetal resin be dissolved in a solvent, thus making a varnish. However, the polyvinyl acetal resin cannot be dissolved in a sufficiently even manner in a generally-used industrial solvent represented by esters such as methyl acetate, ethyl acetate, and butyl acetate, and ketones such as methyl ethyl ketone, acetone, and cyclohexane.

Accordingly, in making the varnish from the polyvinyl acetal resin, there are used, for example, glacial acetic acid, monochloroacetic acid, benzyl alcohol, cresol, xylenol, furfural, dioxane, tetrahydrofuran, pyridine, dichloroethane, chloroform, N-methylpyrrolidone, dimethylsulfoxide, and a mixture solvent of toluene and ethanol. All of these solvents have problems of being high in stimulus property, being relatively high in toxicity to human bodies, being high in environment-polluting property, giving offensive odor, being high in inflammability, etc.

Consequently, in making the varnish from the polyvinyl acetal resin, it is necessary to provide a lot of safety measures by setting up facilities which have satisfactory functions of exhausting air, eliminating harms, eliminating toxicity, removing static electricity, etc., so that the solvent is not brought into contact with a human body or that the solvent is not released to the environment.

Further, the polyvinyl acetal resin is used to obtain film-like electrolyte (gel-typed polyelectrolyte) by gelation of an electrolyte solution in order to achieve an increase in charging/discharging capacity, a decrease in thickness, an enhancement in freedom degree of shapes, and the like purposes in an electrochemical device such as a battery, a capacitor, a solar battery using electrolyte which is called Graetzel cell, and the like device (refer to Japanese Unexamined Patent Publication JP-A 57-143355 (1982), for example). In the related art, when aiming to obtain the film-like electrolyte by use of the polyvinyl acetal resin, a content of the resin needs to be 10% by weight or more based on a total amount of the electrolyte solution, but when molecules of the polyvinyl acetal resin are dispersed into the electrolyte solution in such high concentration, the molecules will disturb the movement of ions. Ion conductivity is thus decreased to a level lower than that of the electrolyte solution itself, resulting in deterioration of electrical load characteristics. A reduced content of the polyvinyl acetal resin can increase the ion conductivity, but leads a decrease in gel strength, which results in loss of such an advantage inherent to the gel-typed polyelectrolyte that a freedom degree of shape of the electrochemical device is enhanced.

Furthermore, it is known that the polyvinyl acetal resin is used as solid-typed polyelectrolyte without impregnating a solvent (refer to Japanese Unexamined Patent Publication JP-A 10-50141 (1998)). However, this electrolyte is also very low in ion conductivity, resulting in a significant decrease in the electrical load characteristics.

DISCLOSURE OF INVENTION

An object of the invention is to provide a polyvinyl acetal resin varnish which is high in safety and less problematic in any one of stimulus property, toxicity, environment-polluting property, offensive odor, and inflammability. Furthermore, an object of the invention is to provide a polyvinyl acetal resin varnish which is low in viscosity in order to enhance workability of painting operation or the like operation.

An object of the invention is to provide a use of the polyvinyl acetal resin varnish which is high in safety and low in viscosity, for an electrolyte solution in an electrochemical device.

Inventors of the invention have completed the invention by discovering that 1) a polyvinyl acetal resin varnish is obtained by preferably mixing a polyvinyl acetal resin into a carbonate ester, and especially the use of a mixture solvent of cyclic carbonate ester and chain carbonate ester causes the polyvinyl acetal resin to be contained in high concentration and become low in viscosity, and that 2) the polyvinyl acetal resin varnish is useful as a nonaqueous electrolyte solution in an electrochemical device or a gelling agent for organic solvent.

The invention provides a polyvinyl acetal resin varnish which is obtained by dissolving a polyvinyl acetal resin in a nonaqueous solvent containing carbonate ester.

In the polyvinyl acetal resin varnish of the invention, it is preferable that the carbonate ester is a mixture of a cyclic carbonate ester and a chain carbonate ester.

Further, in the polyvinyl acetal resin varnish of the invention, it is preferable that a water content is 200 ppm or less.

Further, in the polyvinyl acetal resin varnish of the invention, it is preferable that the polyvinyl acetal resin is polyvinyl formal resin.

Further, in the polyvinyl acetal resin varnish of the invention, it is preferable that the polyvinyl acetal resin is an acid-denatured material.

Further, in the polyvinyl acetal resin varnish of the invention, it is preferable that the polyvinyl acetal resin contains 0.25 mol/kg or less protons which show a peak in a range of 4.25 to 4.35 ppm, using a peak (2.49 ppm) of DMSO-$d_6$ measured with $^1$H-NMR as a standard.

Further, in the polyvinyl acetal resin varnish of the invention, it is preferable that a content of hydroxyl group in the polyvinyl acetal resin is 0.1 to 2 mol/kg.

Further, the invention provides a gelling agent which contains any one of the above-described polyvinyl acetal resin varnishes, the gelling agent causing gelation of an organic solvent.

Further, the invention provides a nonaqueous electrolyte solution which contains an electrolyte and any one of the above-described polyvinyl acetal resin varnishes.

Further, in the nonaqueous electrolyte solution of the invention, it is preferable that the nonaqueous electrolyte solution contains an electrolyte, a nonaqueous solvent, and a polyvinyl acetal resin, wherein a polystyrene-equivalent number average molecular weight λ of the polyvinyl acetal resin obtained by gel permeation chromatography and a concentration c (wt %) of the polyvinyl acetal resin in the nonaqueous electrolyte solution have the following relation:

$$100 \leq \lambda^{1/2} \times c \leq 1000$$

Furthermore, in the nonaqueous electrolyte solution of the invention, it is preferable that a concentration of the polyvinyl acetal resin is 0.3 to 3.5% by weight based on a total amount of the nonaqueous electrolyte solution.

Furthermore, in the nonaqueous electrolyte solution of the invention, it is preferable that the nonaqueous electrolyte solution further contains a compound for producing acid.

Furthermore, in the nonaqeuous electrolyte solution of the invention, it is preferable that the compound for producing acid is Lewis acid and/or Lewis acid salt each having a fluorine atom.

Further, the invention provides an electrochemical device comprising at least a negative electrode, a separator, a positive electrode, and a nonaqueous electrolyte solution, wherein the negative electrode and/or positive electrode and the separator are adhered to each other with a cross-linked material of polyvinyl acetal resin.

Furthermore, in the electrochemical device of the invention, it is preferable that a proportion of the cross-linked material relative to a total amount of the cross-linked material and the nonaqueous electrolyte solution is 3.5% by weight or less.

Furthermore, in the electrochemical device of the invention, it is preferable that the negative electrode contains an active material which is capable of occluding and/or releasing a lithium metal and/or lithium, that the positive electrode contains an active material which can generate electromotive force of 3 V or more relative to a lithium dissolution/deposition potential, and that the nonaqueous electrolyte solution contains electrolyte selected from lithium salts.

Further, the invention provides a method of manufacturing an electrochemical device, comprising the steps of: laminating a negative electrode, a separator, and a positive electrode; charging an electrochemical device obtained by impregnating the laminate with any one of the above-described nonaqueous electrolyte solutions, to thereby produce a cross-linked material of polyvinyl acetal resin; and adhering the negative electrode and/or positive electrode to the separator with the cross-linked material.

The polyvinyl acetal resin varnish of the invention has less safety problems and smaller viscosity compared to a conventional polyvinyl acetal resin varnish which is prepared by using an organic solvent, so that works can be safely and efficiently carried out.

Further, the polyvinyl acetal resin varnish of the invention can be used as a gelling agent for organic solvent, thus allowing gelation of an organic fragrant substance, waste cooking oil, a stimulant biopolymeric material (such as a polymeric material for artificial skin), and an electrolyte solution in an electrochemical device such as a lithium battery and an electric double layer capacitor.

BEST MODE FOR CARRYING OUT THE INVENTION

The invention relates a polyvinyl acetal resin varnish, a nonaqueous electrolyte solution, an electrochemical device, and a manufacturing method thereof. Hereinbelow, respective modes will be explained in detail.

The polyvinyl acetal resin varnish of the invention is a solution in which a polyvinyl acetal resin is dissolved in a carbonate ester solvent.

[Polyvinyl Acetal Resin]

The polyvinyl acetal resin is a generic term used to refer to resins obtained by acetalization of polyvinyl alcohol with aldehyde, resins obtained by esterification of polyvinyl alcohol, resins obtained by acetalization and esterification of polyvinyl alcohol, and the like resins.

Examples of the polyvinyl alcohol resin include polyvinyl acetal resins which contain repeating units of a vinyl acetal unit (1) represented by the following general formula:

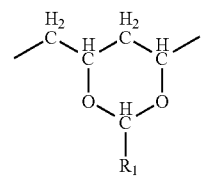

(1)

(wherein $R_1$ represents a hydrogen atom or an alkyl group), a vinyl alcohol unit (2) represented by the following general formula:

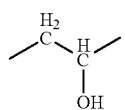

(2)

and a vinyl carboxylate unit (3) represented by the following general formula:

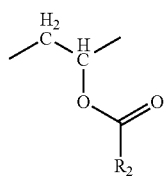

(3)

(wherein $R_2$ represents a hydrogen atom, an alkyl group, or an alkyloxy group). Among these polyvinyl acetal resins, easily obtained are polyvinyl acetal resins which respectively contain 50 to 80 wt % vinyl acetal unit (1), 0.1 to 20 wt % vinyl alcohol unit (2), and 10 to 20 wt % vinyl carboxylate unit (3).

Specific examples of the polyvinyl acetal resin containing the above-stated repeating units (1) to (3) include polyvinyl formal (where $R_1$=a hydrogen atom in the vinyl acetal unit (1) and $R_2$=a methyl group in the vinyl carboxylate unit (3)), polyvinyl acetoacetal (where $R_1$=a methyl group in the vinyl acetal unit (1) and $R_2$=a methyl group in the vinyl carboxylate unit (3)), polyvinyl propyral (where $R_1$=an ethyl group in the vinyl acetal unit (1) and $R_2$=a methyl group in the vinyl carboxylate unit (3)), and polyvinyl butyral (where $R_1$=a propyl group in the vinyl acetal unit (1) and $R_2$=a methyl group in the vinyl carboxylate unit (3)). Among these polyvinyl acetal resins, polyvinyl formal is preferred from the perspective of chemical stability of to-be-obtained varnish.

The polyvinyl acetal resin according to the invention has preferably a small number of the vinyl alcohol units (2) from the aspect of increasing a concentration of the polyvinyl acetal resin dissolved in the varnish, and further has preferably a small molecular weight within a range where adhesiveness and a coating property are not adversely influenced. Note that a content of the vinyl alcohol unit (2) in the polyvinyl acetal resin is preferably 0.1 to 20 wt %, more preferably 0.5 to 10 wt %, and particularly preferably 1 to 6 wt %. The content of the vinyl alcohol unit (2) which is far smaller than 0.1 wt %, may cause a decrease in a coating property, adhesiveness, a gelling property of organic solvent, etc. of the polyvinyl acetal resin. In contrast, the content of the vinyl alcohol unit (2) which largely exceeds 20 wt %, may decrease too much the concentration of the polyvinyl acetal resin dissolved in the varnish. In the meantime, the content of the vinyl alcohol unit (2) in the polyvinyl acetal resin is dependent on a type of the polyvinyl acetal resin and a production method thereof, and for example, 10 to 20 wt % in polyvinyl butyral and around 5 wt % in polyvinyl formal which is more preferable. It is a matter of course that the other types of the polyvinyl acetal resin can be favorably used as in the case of polyvinyl formal, if the content of the vinyl alcohol unit (2) in the resin can be adjusted to fall in the above-stated range.

In the polyvinyl acetal resin according to the invention, it is preferred that the content of the vinyl acetal unit (1) be larger than that of the vinyl carboxylate unit (3) from the perspective of chemical stability of the varnish. The content of the vinyl acetal unit (1) is appropriately selected from a preferable range of 50 to 99 wt %, a more preferable range of 60 to 95 wt %, and a particularly preferable range of 75 to 95 wt %.

The molecular weight of the polyvinyl acetal resin is dependent on the molecular weight of a raw material, i.e. polyvinyl alcohol, and when indicated on a scale of the number average degree of polymerization of the raw material, i.e. vinyl alcohol, it is preferably 50 to 5000, more preferably 100 to 3000, and particularly preferably 300 to 1500. Too small amount of the molecular weight of the polyvinyl acetal resin may deteriorate the coating property, adhesiveness, gelling property for organic solvent, etc. of the polyvinyl acetal resin.

Furthermore, among the polyvinyl acetal resins, the polyvinyl acetal resin containing 0.1 to 2 mol/kg of a hydroxyl group is preferable, and the polyvinyl acetal resin containing 0.3 to 1.5 mol/kg of a hydroxyl group is more preferable.

Note that in the invention, the polyvinyl acetal includes polyvinyl acetate and vinyl polypropionate.

[Method of Manufacturing the Polyvinyl Acetal Resin]

The polyvinyl acetal resin can be manufactured by acetalization and/or esterification of polyvinyl alcohol.

The acetalization of polyvinyl alcohol can be carried out in accordance with a known method. For example, aldehyde may be acted on polyvinyl alcohol in the presence of an acid catalyst in water. Known aldehyde may be used, and usable aldehyde includes formaldehyde, acetaldehyde, propionaldehyde, butylaldehyde, and isobutylaldehyde. Among these types of aldehyde, formaldehyde is preferred. A usage of aldehyde may be appropriately selected according to a concentration of polyvinyl alcohol and the like element, and is preferably 0.1 to 4 mol and more preferably 0.2 to 3 mol per liter of a reaction solvent (water). Examples of the acid catalyst include sulfuric acid, hydrochloric acid, nitric acid, phosphoric acid, trichloroacetic acid, and organic sulfonic acid, among which sulfuric acid and hydrochloric acid are preferred. A usage of the acid catalyst may be appropriately selected according to concentrations of polyvinyl alcohol resin, aldehyde, and the like element, and is preferably 1 to 6 gram equivalents and more preferably 2 to 5 gram equivalents per liter of a reaction solvent (water). The reaction for acetalization is carried out in a temperature of preferably 5 to 90° C. and more preferably 25 to 80° C., and completed after around one to ten hours.

The esterification of polyvinyl alcohol includes formic acid esterification, acetic acid esterification, propionic acid esterification, carbonate esterification, and cyclic carbonate esterification of a 1,2-hydroxyethylene structure and/or a 1,3-hydroxy-1,3-propylene structure contained in polyvinyl alcohol.

The esterification of polyvinyl alcohol can be carried out in accordance with a known method such as a transesterification reaction. The carbonate esterification is taken as an example to explain the esterification. The carbonate esterification can be carried out in a manner that polyvinyl alcohol and dialkyl carbonate are directly subjected to a transesterification reaction, or mixed in a solvent and then subjected to the transesterification reaction, in the presence or absence of an esterification catalyst. As the esterification catalyst, ingredients regularly used in this field can be used including ion-exchange resin containing an alkylammonium salt, a pyridinium salt, diazabicyclo alkenes, tertiary amine, an alkylammonium group, and a tertiary amino group; and an alkaline catalyst. One or two or more of the esterification catalysts can be used. A usage of the catalyst for esterification reaction may be appropriately selected from a wide range in accordance with the usage of polyvinyl alcohol, the type and usage of dialkyl carbonate, the type and usage of the solvent, the reaction temperature, the reaction pressure, the reaction time, the target value for a degree of the carbonate esterification, and the like element, and is preferably 50 wt % or less and preferably 30 wt % or less based on a total amount of polyvinyl alcohol. The dialkyl carbonate includes dimethyl carbonate, diethyl carbonate, methylethyl carbonate, di-n-propyl carbonate, diisopropyl carbonate, di-n-butyl carbonate, diisobutyl carbonate, and di-sec-butyl carbonate. The usage of dialkyl carbonate is not particularly limited, and a molar quantity thereof is preferably 0.1 to 20 times and more preferably 0.1 to 10 times larger than that of polyvinyl alcohol. As the solvent, it is possible to use an ingredient in which respective raw materials can be dissolved or dispersed and which is inert to the transesterification reaction, including: aliphatic hydrocarbons; aromatic hydrocarbons such as benzene, toluene, and xylene; ketones such as acetone, methyl ethyl ketone, and methyl propyl ketone; halogenated hydrocarbons such as dichloromethane and dichloroethane; esters such as diglyme; dioxane; and tetrahydrofuran. One or two or more of these solvents can be used. The reaction for carbonate esterification is carried out preferably at either temperature which is lower, of a boiling point of by-product alcohol obtained by the reaction and 200° C., and more preferably at a temperature of 50 to 180° C., and completed after 5 minutes to 50 hours and preferably 10 minutes to 30 hours. Note that the reaction for carbonate esterification can be carried out under any of the reduced, normal, and increased pressures. Reactions for the other esterifications can be carried out as in the case of the conventional method, except that dialkyl carbonate is correspondingly replaced with other raw material compounds.

The acetalization and esterification of polyvinyl alcohol can be carried out by applying the acetalization and exterification to polyvinyl alcohol as in the case of the above.

[Acid Denaturation of Polyvinyl Acetal Resin]

Although the above-stated polyvinyl acetal resin may be used without modification as a raw material for preparing the varnish, it is desired that the polyvinyl acetal resin according to the invention be treated with acid denaturation from the perspective of the gelling properties of later-described organic solvent and nonaqueous electrolyte solution. The reason is not clear enough, but speculated as follows. That is to say, the vinyl alcohol unit (2) can exist in the polyvinyl acetal resin in either states of a random state where the unit is isolated in a macromolecular chain and a block state where a plurality of the units continues, typified by 1,2-dihydroxy-ethyelene structure and 1,3-dihydroxy-1,3-propylene structure. The acid denaturation leads an intramolecular exchange reaction in an acetal ring, and causes the isolated vinyl alcohol unit (2) to change into the structure where the plurality of the units are linked with each other. This presumably enhances the gelling property of the organic solvent.

An acid-denatured material of polyvinyl acetal resin according to the invention is preferably an acid-denatured material of polyvinyl formal resin which contains preferably 0.1 to 2 mol and particularly preferably 0.3 to 1.5 mol of a hydroxyl group per kilogram of the acid-denatured material.

In the case where the content of the hydroxyl group falls in a range of 0.1 to 2 mol, particularly favorable are, for example, solubility or uniform swelling property of the acid-denatured material into the nonaqueous electrolyte solution, and adhesiveness between the negative electrode and/or positive electrode and the separator obtained by the cross-linking of the acid-denatured material.

The molecular weight of the acid-denatured material of the polyvinyl acetal resin is not particularly limited, and in the case of using the polyvinyl acetal resin for gelling the nonaqueous electrolyte solution in the electrochemical device, for example, the molecular weight is preferably 3000 to 300,000, more preferably 10,000 to 150,000, and particularly preferably 40,000 to 80,000, in order to obtain a favorable infusion property (injection property) of the nonaqueous electrolyte solution into the electrochemical device and to enhance adhesive strength of the laminate composed of the negative electrode, separator, and positive electrode in the electrochemical device. In this case, the molecular weight means a polystyrene-equivalent number average molecular weight obtained by a GPC (gel permeation chromatography) measurement. Further, the molecular weight of the polyvinyl acetal resin is dependent on the degree of polymerization and molecular weight of side-chain substituent of the raw material, i.e. polyvinyl alcohol, and when indicated on a scale of the number average degree of polymerization of the raw material, i.e. vinyl alcohol, it can also be represented as preferably 50 to 5000, more preferably 100 to 3000, and particularly preferably 300 to 1500.

Note that in order to determine the acid denaturation of polyvinyl acetal resin, the inventors measure the $^1$H-NMR spectrum of polyvinyl acetal resin before and after the acid denaturation. A peak (2.49 ppm) of DMSO-$d^6$ is used as a standard to speculate that the polyvinyl acetal resin has been acid-denatured when a peak appearing in a region of 4 to 5 ppm is decreased. In such a region, it is considered that there appears a peak derived from the hydroxyl group in the vinyl alcohol unit of the polyvinyl acetal resin, which peak is presumably peculiar to the hydroxyl group isolated as surrounded by an acetal ring, a carboxyl group, and the like element. Since the acid denaturation decreases an amount of the isolated hydroxyl groups, the decrease of the peak is observed.

In the meantime, the polyvinyl acetal resin contains, together with the above-stated isolated hydroxyl group, a hydroxyl group having 1,2-dihydroxy ethylene structure and/or 1,3-dihydroxy-1,3-propylene structure derived from a structure which has a plurality of continuous vinyl alcohol units in a main chain. The decrease of the above-stated isolated hydroxyl groups leads an increase of proportion of the hydroxyl group in the 1,2-dihydroxy ethylene and/or 1,3-dihydroxy-1,3-propylene structure relative to a total amount of the hydroxyl group in the polyvinyl acetal resin. Such an increase presumably attains 70 mol % or more and more preferably 80 mol % or more.

Further, to take the polyvinyl formal resin as an example, the peak in the region of 4.25 ppm to 4.35 ppm is decreased or disappears by the acid denaturation. The polyvinyl formal resin usually has 0.3 mol/kg or more protons which correspond to the peak in the region of 4.25 ppm to 4.35 ppm before the acid denaturation. The acid denaturation causes the protons corresponding to the peak in the region of 4.25-4.35 ppm to be decreased by 30% or more and preferably 50% or more to a level of preferably 0.25 mol/kg or less and more preferably 0.15 mol/kg or less.

The same sort of measurement is performed on the polyvinyl acetal resin other than the polyvinyl formal resin to identify a change of peak intensity, thus allowing a determination of whether or not the acid treatment has been applied.

[Method of Acid Denaturation of Polyvinyl Acetal]

The acid denaturation of the polyvinyl acetal resin is carried out in accordance with one of various known methods. For example, the polyvinyl acetal resin is suspended or dissolved in a nonaqueous solvent to which an appropriate acid catalyst is then added, followed by heating under or without stirring.

The content of the polyvinyl acetal resin in the nonaqueous solvent is not particularly limited, and in consideration of smooth progress of the reaction, etc., the content is 0.2 to 20 wt % and preferably 1 to 10 wt % based on a total mount of a reaction mixture preferably composed of polyvinyl acetal resin, an acid catalyst and a nonaqueous solvent. As the acid catalyst, it is possible to use known acid including acetic acid, phosphoric acid, hydrochloric acid, fluorinated acid, sulfuric acid, trifluoroacetic acid, and nitric acid. Among these ingredients, acetic acid, sulfuric acid, and fluorinated acid are desirable. The acid can be used alone or two or more of the acids can be used in combination. A usage of the acid is not particularly limited and preferably 0.0005 to 1 wt % and more preferably 0.001 to 0.01 wt % based on the total amount of the reaction mixture.

As the nonaqueous solvent, it is possible to use any solvent which does not disturb an intramolecular exchange reaction in an acetal ring. Among such solvents, carbonate esters and carboxylic acid esters are preferred. The nonaqueous solvent can be used alone or two or more of the nonaqueous solvents can be used in combination. Carbonate ester is more desirable because, in the case of using carbonate ester as a reaction solvent, a solvent obtained after completion of the reaction can be used as the varnish of the invention without modification. A reaction between polyvinyl acetal resin and acid is carried out at a temperature of preferably a room temperature to 100° C. and more preferably 40 to 70° C., and completed after preferably 1 to 100 hours and more preferably 5 to 48 hours.

After the completion of reaction, an acid-denatured material is separated from the reaction mixture containing the acid-denatured material of polyvinyl acetal resin by generally-used refining method such as reprecipitation, and used for the varnish of the invention.

[Nonaqueous Solvent]

As a nonaqueous solvent used for the varnish, carbonate ester is used.

Carbonate ester has a structure composed of esterified carbonic acid and alcohol, and forms a solvent which is less stimulant and less toxic with less offensive odor and very small influence to environment. Further, carbonate ester is characterized in far lower inflammability and thus higher safety than a similarly-structured carbonate ester solvent. For example, an ignition point of ethyl acetate is −4° C. while an ignition point of diethyl acetate is 31° C. that is equal to or higher than the room temperature. Consequently, the polyvinyl acetal resin varnish of the invention enables safer works than the conventionally-used polyvinyl acetal resin varnish.

The carbonate ester includes chain carbonate ester in which two substituents are not linked with each other, and cyclic carbonate ester having a structure in which two substituents are linked with each other.

The chain carbonate ester includes dimethyl carbonate, ethyl methyl carbonate, diethyl carbonate, methyl n-propyl carbonate, ethyl n-propyl carbonate, di-n-propyl carbonate, methyl isopropyl carbonate, ethyl isopropyl carbonate, di-isopropyl carbonate, butyl methyl carbonate, butyl ethyl carbonate, butyl n-propyl carbonate, dibutyl carbonate, methyl-2,2,2-trifluoroethyl carbonate, ethyl-2,2,2-trifluoroethyl carbonate, di(2,2,2-trifluoroethyl)carbonate, methyl-3,3,3,2,2-pentafluoropropyl carbonate, ethyl-3,3,3,2,2-pentafluoropropyl carbonate, propyl-3,3,3,2,2-pentafluoropropyl carbonate, and di(3,3,3,2,2-pentafluoropropyl)carbonate.

The cyclic carbonate ester includes ethylene carbonate, 1,2-propylene carbonate, 1,3-propylene carbonate, 1,2-butylene carbonate, 2,3-butylene carbonate, 1,2-pentene carbonate, 2,3-pentene carbonate, 1,2-hexene carbonate, 2,3-hexene carbonate, 3,4-hexene carbonate, n-butyl ethylene carbonate, n-hexyl ethylene carbonate, cyclohexyl ethylene carbonate, fluoroethylene carbonate, 1,1-difluoroethylene carbonate, 1,2-difluoroethylene carbonate, trifluoromethyl ethylene carbonate, fluoromethyl ethylene carbonate, difluoromethyl ethylene carbonate, and chloroethylene carbonate.

Among the above-cited carbonate esters, it is desired to use carbonate ester of which molecular weight is small from the perspectives of the solubility of polyvinyl acetal resin and the viscosity of varnish. As such carbonate ester, desirable are ethylene carbonate, 1,2-propylene carbonate, 1,3-propylene carbonate, dimethyl carbonate, ethyl methyl carbonate, diethyl carbonate, methyl n-propyl carbonate, ethyl n-propyl carbonate, di-n-propyl carbonate, methyl isopropyl carbonate, ethyl isopropyl carbonate, di-isopropyl carbonate, and di-n-propyl carbonate, and more desirable are ethylene carbonate, 1,2-propylene carbonate, dimethyl carbonate, ethyl methyl carbonate, and diethyl carbonate, and the most desirable are ethylene carbonate and 1,2-propylene carbonate.

The chain carbonate ester and the cyclic carbonate ester may be used each alone or mixed with each other, and in order to furthermore enhance the solubility of the polyvinyl acetal resin, it is preferable to use the mixed solvent of the chain carbonate ester and the cyclic carbonate ester. In the case of using only one of the chain carbonate ester and the cyclic carbonate ester, the polyvinyl acetal resin is limited to polyvinyl acetal resin having a specific molecular weight or chemical structure, or heat is applied in preparing the varnish, so that the polyvinyl acetal resin can be dissolved. Enhancement of the solubility of the polyvinyl acetal resin means, for example, that the polyvinyl acetal resin is dissolved in higher concentration, that any types of the polyvinyl acetal resin can be dissolved, that no heating is necessary in dissolving (in preparing the varnish), and that no deposition of the polyvinyl acetal resin is found even when a temperature of the varnish decreases to a room temperature or lower level after preparation of the varnish.

In the case of using the mixed solvent of the cyclic carbonate ester and the chain carbonate ester, the solubility of the polyvinyl acetal resin is highly enhanced, and the concentration of the polyvinyl acetal resin dissolved in the varnish is largely enhanced, thus allowing the viscosity of the varnish to be decreased.

Reasons why such effects can be obtained are not clear, but it is considered that a polar portion of the polyvinyl acetal resin is dissolved by the cyclic carbonate ester while a nonpolar portion is dissolved by the chain carbonate ester, and furthermore that a mutual solubility between the cyclic carbonate ester and the chain carbonate ester is highly favorable.

As a combination of the mixed solvent of the cyclic carbonate ester and the chain carbonate ester, there are used ethylene carbonate and/or 1,2-propylene carbonate as the cyclic carbonate ester, and dimethyl carbonate, ethyl methyl carbonate, diethyl carbonate, dimethyl carbonate and ethyl methyl carbonate, and diethyl carbonate and ethyl methyl carbonate as the chain carbonate ester. Among these ingredients, the combination containing ethylene carbonate is desired because of enhanced solubility of the polyvinyl acetal resin.

A volume composition ratio (cyclic carbonate ester:chain carbonate ester) between the cyclic carbonate ester and the chain carbonate ester may be appropriately selected from a wide range in accordance with the type and concentration of to-be-dissolved polyvinyl acetal resin, and is preferably 1:19 to 19:1, more preferably 1:4 to 9:1, and particularly preferably 1:3 to 3:1. By setting the ratio within such a range, it is possible to enhance the concentration of the polyvinyl acetal resin dissolved in the varnish and to reduce the viscosity of the varnish.

Further, a water content contained in the nonaqueous solvent is 200 ppm or less, preferably 50 ppm or less, and more preferably 20 ppm or less. When the water content contained in the nonaqueous solvent falls within the above range, a water content contained in the polyvinyl acetal resin varnish is small, resulting in favorable varnish.

[Polyvinyl Acetal Resin Varnish]

The polyvinyl acetal resin varnish of the invention is made of the above-described polyvinyl acetal or acid-denatured material thereof and carbonate ester solvent.

The concentration of the polyvinyl acetal resin in the varnish of the invention is not particularly limited, and may be appropriately selected from a wide range according to a type of polyvinyl acetal resin, an application of resultant varnish, and the like element. Considering the viscosity of varnish, etc., the content of polyvinyl acetal resin is preferably 0.2 to 20 wt %, more preferably 1 to 10 wt %, and particularly preferably 1 to 5 wt % based on the total amount of varnish. The concentration may be selected from various values within the above range according to the application.

Note that according to a type of a nonaqueous solvent in use, the type of the polyvinyl acetal resin is appropriately selected from the polyvinyl acetal resins which will be dissolved in the nonaqueous solvent, in consideration of its solubility in the nonaqueous solvent, the viscosity of varnish, the gelling property of a later-described organic solvent, and the like element.

The water content contained in the varnish of the invention is desirably small from the perspective of the gelling properties of the later-described organic solvent, the nonaqueous solvent in the electrochemical device, and the like element. However, the excessively small water content may cause gelation of the varnish. It is thus necessary to contain an adequate amount of water. Accordingly, the water content is preferably 2 ppm or more and 200 ppm or less, more preferably 2 ppm or more and 100 ppm or less, and particularly preferably 5 ppm or more and 50 ppm or less. A method of reducing the water content contained in the varnish includes a method of reducing in advance the water contents contained in the nonaqueous solvent and polyvinyl acetal resin, a method of removing water by letting out a small amount of the nonaqueous solvent contained in the varnish through evaporation and then letting out water by boiling the nonaqueous solvent together therewith, and a method of removing water by treating the varnish with a dehydration agent. The dehydration agent includes, for example, a water adsorbent such as anhydrous sodium sulfate, molecular sieves, or silica gel. The water adsorbent is supplied into a column to let the varnish flow or mixed into the varnish which is then stirred, thereby removing the water in the varnish. By using these methods, the water content contained in the varnish can be set at 50 ppm or less.

The varnish of the invention may contain a solvent other than carbonate ester and synthetic resin other than polyvinyl acetal resin to a degree that its favorable characteristics are not impaired (for example, a degree that the stimulating degree, toxicity, inflammability, etc. are not increased so much as to cause troubles in works). The solvent other than carbonate ester includes water, alcohols, carbonate esters, ethers, amides, carbamate esters, phosphate esters, aromatic hydrocarbons, and fluoro-substituted hydrocarbons. Further, the synthetic resin other than polyvinyl acetal resin is not particularly limited, for example, including polyester, polycarbonate, polyether, and polyimide which are evenly dissolved in a nonaqueous solvent such as carbonate ester and do not impair adhesiveness, a coating property, and a later-described gelling property of the polyvinyl acetal resin.

Next, the application of the polyvinyl acetal resin varnish of the invention will be explained.

[Gelation of Organic Solvent Effected by Polyvinyl Acetal Resin Varnish]

The polyvinyl acetal resin varnish of the invention can be used as a gelling agent for gelling various organic solvents. The gelling agent of the invention is able to cause gelation of an organic solvent even with such a small amount of the polyvinyl acetal resin as 1 to 2 wt % in concentration. This property allows the varnish of the invention to be utilized as a gelling agent for an organic fragrant substance, a simulant biopolymeric material (such as a material for artificial skin), and a nonaqueous electrolyte solution in an electrochemical device such as a lithium battery and an electric double layer capacitor. For example, the application to gelation of the nonaqueous electrolyte solution will effectively prevent the electrochemical device from having a leaking liquid and enhance the freedom degree of shape of the electrochemical device.

The mechanism of gelation of organic solvent effected by the polyvinyl acetal resin varnish is not all clear, but it is considered that when water is removed from the organic solvent in which the polyvinyl acetal resin is evenly dissolved, hydroxyl groups of the vinyl alcohol unit (2) of the polyvinyl acetal resin strongly interact to be pseudo-bonded to each other, thus forming a three-dimensional network of polyvinyl acetal resin in the organic solvent.

A water content contained in the gelling agent of the invention is desirably small and preferably 200 ppm or less, more preferably 100 ppm or less, and particularly preferably 50 ppm or less. A dehydration agent is used for removing water from the varnish. As the dehydration agent, a reactive dehydration agent is desired for completely or almost completely removing water from the varnish and the organic solvent. Such a dehydration agent includes silyl esters, borate esters, disilazanes, isocyanates, an organic metal compound, and metal alkoxides. An additive amount of the dehydration agent is determined in consideration of the water content contained in a mixture of the polyvinyl acetal resin varnish and the organic solvent gelation of which will be caused. Usually, it is desired that the additive amount be 1 to 100 times larger, preferably 10 to 50 times larger than an equivalent weight for reaction with water contained in the mixture.

[Nonaqueous Electrolyte Solution]

The nonaqueous electrolyte solution of the invention contains the polyvinyl acetal resin varnish of the invention and electrolyte as essential constituents. The nonaqueous electrolyte solution of the invention may contain a compound for producing acid.

Further, the polyvinyl acetal resin may have or have not been acid-denatured, and more preferred is an acid-denatured one. The use of the polyvinyl acetal resin varnish of the invention easily causes gelation of the nonaqueous electrolyte solution, and moreover enhances the adhesiveness between the negative electrode and/or positive electrode and the separator of the later-described electrochemical device.

(a) Varnish Containing Polyvinyl Acetal Resin

The varnish containing polyvinyl acetal resin is obtained by dissolving the above-described polyvinyl acetal resin in the nonaqueous solvent.

The carbonate ester solvent used for forming the polyvinyl acetal resin into the varnish also acts in the nonaqueous electrolyte solution of the invention as a solvent for nonaqueous electrolyte solution in which electrolyte is dissolved or dispersed. As the nonaqueous solvent used for the varnish of the invention, carbonate ester is used as described above, but when used for the solvent for nonaqueous electrolyte solution, there may also be contained a nonaqueous solvent which is generally-used in this field other than carbonate ester.

The nonaqueous solvent other than the carbonate ester includes, for example, cyclic carbonate esters such as γ-butyrolactone; chain carbonate esters such as methyl acetate, methyl propionate, pentafluoropropyl acetate, and trifluoromethyl acetate; ethers such as dimethoxyethane and tetrahydrofuran; amides such as N-methylpyrrolidone and dimethylformamide; carbamates such as methyl-N,N-dimethylcarbamate and N-methyloxazolidinone; ureas such as N,N-dimethylimidazolidinone; borate esters such as borate triethyl and borate tributyl; phosphate esters such as trimethyl phosphate and trioctyl phosphate; aromatic hydrocarbons such as benzene, toluene, xylene, fluorobenzene, fluorotoluene, chlorobenzene, biphenyl, and fluorobiphenyl; and fluorinated ethers such as trifluoroethyl methyl ether. The nonaqueous solvent can be used alone or two or more of the nonaqueous solvents can be used in combination. Although some of these nonaqueous solvents have stimulus properties, toxicities, environment-polluting properties, offensive odor, inflammabilities, etc., no particular problems arise since the nonaqueous electrolyte solution in hermetically closed inside the electrochemical device when used, and further since an amount of the nonaqueous electrolyte solution is small.

[Content of Polyvinyl Acetal Resin in Nonaqueous Electrolyte Solution]

A content of the polyvinyl acetal resin in the nonaqueous electrolyte solution is not particularly limited, and is preferably 0.3 to 3.5 wt % and more preferably 0.7 to 2.3 wt % based on a total amount of the nonaqueous electrode solution from the perspective of preventing as much as possible the deterioration of ion conductivity, load characteristics, high-temperature preservation stability, etc. of the electrochemical device, and of enhancing as much as possible the mechanical strength of a laminate composed of negative electrode, separator, and positive electrode of the electrochemical device.

Furthermore, in the invention, it is desired that from the perspective of further enhancing an injection property of the nonaqueous electrolyte solution into the electrochemical device and the adhesive strength of the laminate composed of the negative electrode, separator, and positive electrode, a product ($\lambda^{1/2} \times c$) of a square root ($\lambda^{1/2}$) of number average molecular weight $\lambda$ of the polyvinyl acetal resin and a concentration c (wt %) of the polyvinyl acetal resin in the nonaqueous electrolyte solution fall in a range between preferably 100 to 1000 ($100 \leq \lambda^{1/2} \times c \leq 1000$) and more preferably ($200 \leq \lambda^{1/2} \times c \leq 800$). In this case, the number average molecular weight means a polystyrene-equivalent number average molecular weight obtained by a gel permeation chromatography (GPC) measurement. Conditions for the gel permeation chromatography are as follows. A differential refractive index detector is used as a detector. Two columns of Shoudex KF-805L (trade name) are used as separation columns. A Shoudex KF-800P (trade name) is used as a precolumn. Tetrahydrofuran is used as a carrier solvent. Polystyrene for a standard of molecular weight and 20 mg of sample polyvinyl acetal resin are dissolved in 20 ml of tetrahydrofuran, thus forming a sample. A flow rate of the carrier solvent is set at 1 ml/min, and 100 μl of the sample is injected at 30° C., thus obtaining a chromatogram.

(b) Electrolyte

The electrolyte may be appropriately selected from electrolytes which are generally used in this field, according to the type of the electrochemical device. The use of the nonaqueous electrolyte solution of the invention containing, for example, a lithium salt as the electrolyte results in a lithium battery which is excellent in charging/discharging load characteristics and shape-retaining property. Further, the use of the nonaqueous electrolyte solution of the invention containing an alkylammonium salt as the electrolyte results in an electric double layer capacitor which is excellent in charging/discharging load characteristics and shape-retaining property. The content of the electrolyte in the nonaqueous electrolyte solution may be appropriately selected from a wide range according to the type of electrolyte and the type of electrochemical device, and is usually 0.1 to 10 mol/liter and preferably 0.3 to 3 mol/liter.

(c) Compound for Producing Acid

It is preferred that a compound for producing acid be added, together with the polyvinyl acetal resin varnish and the electrolyte, to the nonaqueous electrolyte solution of the invention. The compound for producing acid exhibits an action of mainly catalyzing an aldehyde group which is produced from a hydroxyl group in a main chain of the polyvinyl acetal resin by energization at charging step, and a hydroxyl group which has been free from electrolytic oxidation, existing in a 1,2-dihydroxy ethylene structure or 1,3-dihydroxy-1,3-propylene structure in the main chain of the polyvinyl acetal resin. Further, it also allows the polyvinyl acetal resin to be acid-denatured. Accordingly, even when the polyvinyl acetal resin contained in the nonaqueous electrolyte solution has not been acid-denatured, the addition of the compound for producing acid will allow production of acid through addition of water, and if acid is produced at the charging step and the aging step, it is also possible to acid-denature the polyvinyl acetal resin in the electrolyte solution. However, from the perspective of enhancing the adhesive strength of the laminate composed of the negative electrode, separator, and positive electrode, it is preferable to add to the nonaqueous electrolyte solution the polyvinyl acetal resin varnish which is obtained by acid-denaturalizing the polyvinyl acetal resin in advance.

The use of the compound for producing acid in the nonaqueous electrolyte solution of the invention easily causes gelation of the nonaqueous electrolyte solution, and enhances the adhesiveness of the negative electrode and/or positive electrode and separators of the later-described electrochemical device.

The compound for producing acid includes, for example, a compound which produces acid through a reaction with water, and a compound which is subjected to the electrolytic oxidation within a range of operating voltage of the electrochemical device. Particularly preferable is the compound which produces acid through the reaction with water.

The compound which produces acid through the reaction with water, reacts with water remaining in the separator and electrodes of the electrochemical device. The production of acid can be accelerated by warming at the aging step. Note that water in the electrochemical device cannot be completely removed by the current technique. Such a compound includes known compounds which produce acid through the reaction with water, including Lewis acid and Lewis acid salt each having a halogen atom, and sulfate ester and nitrate ester, for example. Lewis acid having a halogen atom includes, for example, $PF_nR_{(5-n)}$ (n=1 to 5, R=organic group), $BF_nR_{(3-n)}$ (n=1 to 3, R=organic group), $AsF_nR_{(5-n)}$ (n=1 to 5, R=organic group), $SiF_nR_{(4-n)}$ (n=1 to 4, R=organic group), $AlF_nR_{(3-n)}$ (n=1 to 3, R=organic group), $TiF_nR_{(4-n)}$ (n=1 to 4, R=organic group), $PCl_nR_{(5-n)}$ (n=1 to 5, R=organic group), $BCl_nR_{(3-n)}$ (n=1 to 3, R=organic group), $AsCl_nR_{(5-n)}$ (n=1 to 5, R=organic group), $SiCl_nR_{(4-n)}$ (n=1 to 4, R=organic group), $AlCl_nR_{(3-n)}$ (n=1 to 3, R=organic group), and $TiCl_nR_{(4-n)}$ (n=1 to 4, R=organic group). The Lewis acid salt having a halogen atom includes, for example, $LiPF_6$, $LiBF_4$, $LiAsF_6$, $Li_2SiF_6$, $LiClO_4$, $LiPF_n(C_kF_{(2k+1)})_{(6-n)}$ (n=1 to 5, k=integer of 1 to 8), $LiBF_n(C_kF_{(2k+1)})_{(4-n)}$ (n=1 to 3, k=integer of 1 to 8), $R_4NPF_6$ (R=organic group), $R_4NBF_4$ (R=organic group), $R_4NAsF_6$ (R=organic group), $R_4N_2SiF_6$ (R=organic group), $R_4NPF_n(C_kF_{(2k+1)})_{(6-n)}$ (n=1 to 5, k=integer of 1 to 8, R=organic group), and $R_4NBF_n(C_kF_{(2k+1)})_{(4-n)}$ (n=1 to 3, k=integer of 1 to 8, R=organic group). The halogen atom includes fluorine, chlorine, and bromine, and in consideration of influence on corrosion resistance of the electrochemical device, a fluorine atom is preferable. The sulfate ester includes, for example, 1,3-propanesultone, methylbenzenesulfonate, 1,3-propa-2-ensultone, 1,4-butanesultone, dimethyl sulfate, diethyl sulfate, and ethylene sulfate. The nitrate ester includes, for example, ethyl nitrate. Among these ingredients, the Lewis acid and Lewis acid salt each having a halogen atom are preferred, and in consideration of handling condition and availability, further preferred are $LiPF_6$, $LiBF_4$, $R_4NPF_6$ (R=organic group), $R_4NBF_4$ (R=organic group), and $SiF_nR_{(4-n)}$ (n=1 to 4, R=organic group). Moreover, particularly preferred are $LiPF_6$, $LiBF_4$, $R_4NPF_6$ (R=organic group), and $R_4NBF_4$ (R=organic group), each of which acts also as an electrolyte salt of the electrochemical device. The above compound can be used alone or two or more of the compounds can be used in combination. A content of the compound which produces acid through the reaction with water, in the nonaqueous electrolyte solution is appropriately selected according to the type of the electrochemical device. To take as an example the case where the electrochemical device is a lithium battery, the content of the compound in the nonaqueous electrolyte solution is 0.2 mol/liter or less and preferably 0.05 mol/liter or less since the compound may deteriorate battery characteristics. However, in the case where the electrochemical device is the lithium batter and where the compound is Lewis acid or Lewis acid salt having a fluorine atom and a lithium salt, the content may exceed 0.2 mol/liter because an adverse effect on the characteristics is hardly likely to appear.

The compound subjected to the electrolytic oxidation within the range of operating voltage of the electrochemical device is brought under the electrolytic oxidation at the initial charging step of the electrochemical device to thereby produce acid, and thus able to contribute to cross-linking of the polyvinyl acetal resin. Such a compound includes, for example, protogenic compounds such as water, methanol, ethanol, propanol, ethylene glycol, diethylene glycol, polyethylene glycol, propylene glycol, toluene, diphenylmethane, cyclohexylbenzene, acetone, malonates, and polyvinyl alcohol. The above compound can be used alone or two or more of the compounds can be used in combination. The voltage applied at the initial charging may be appropriately selected from the range of operating voltage of the electrochemical device so that the compound can be subjected to the electrolytic oxidation. For example, in the case where the compound subjected to the electrolytic oxidation is one of the alcohols, the voltage is set at 3 V or more, and in the case where the compound subjected to the electrolytic oxidation is one of the aromatic compounds, the voltage is set at 4 V or more, relative to a dissolution/deposition potential of lithium. The content of the compound subjected to the electrolytic oxidation in the nonaqueous electrolyte solution may be appropriately selected from a wide range according to the type of the electrochemical device and the type of a cross-linking polymeric material existing in the laminate composed of the negative electrode, separator, and positive electrode, and is usually 0.002 to 0.1 mol/liter and preferably 0.005 to 0.05 mol/liter.

Further, it is also possible to use in combination the above compound which produces acid through the reaction with water and the compound which is subjected to the electrolytic oxidation within the range of the operating voltage of the electrochemical device.

Among these ingredients, preferred is the compound which produces acid through the reaction with water, and particularly preferred is Lewis acid and Lewis acid salt each having a halogen atom.

(d) Preparation of Nonaqueous Electrolyte Solution

The nonaqueous electrolyte solution of the invention can be prepared according to an ordinary method so as to have a desired composition. For example, there are the following methods: a method in which another nonaqueous electrolyte solution made of the lithium salt and the solvent for nonaqueous electrolyte solution is prepared in advance, and the polyvinyl acetal resin varnish of the invention and the compound for producing acid are mixed and thus dissolved in the previously prepared nonaqueous electrolyte solution; a method in which the lithium salt and the compound for producing acid are mixed and thus dissolved in the polyvinyl acetal resin varnish of the invention; and a method in which the nonaqueous solvent, the lithium salt, and the compound for producing acid are mixed and thus dissolved in the polyvinyl acetal resin varnish. Among these methods, most desired from the perspective of workability is the method in which another nonaqueous electrolyte solution made of the lithium salt and the solvent for nonaqueous electrolyte solution is prepared in advance, and the polyvinyl acetal resin varnish of the invention and the compound for producing acid are mixed and thus dissolved in the previously prepared nonaqueous electrolyte solution. Note that the compound for producing acid is added according to need. Usually, the nonaqueous electrolyte solution obtained as described above is injected into the electrochemical device.

Further, the nonaqueous electrolyte solution of the invention can be prepared by fabricating the laminate which contains the polyvinyl acetal resin in the separator or between the negative electrode and/or positive electrolyte and the separator, and then injecting to the laminate a generally-used nonaqueous electrolyte solution (containing no polyvinyl acetal resin) in which electrolyte is dissolved in a nonaqueous solvent. The above-mentioned generally-used nonaqueous electrolyte solution injected to the laminate comes into contact with the polyvinyl acetal resin, which causes the polyvinyl acetal resin to be dissolved or swollen in the nonaqueous electrolyte solution, resulting in the nonaqueous electrolyte solution of the invention.

In the case of employing the preparation method as described above, it is preferred that the polyvinyl acetal resin be left for a while after the generally-used nonaqueous electrolyte solution is injected to the laminate, in order to sufficiently dissolve or swell the polyvinyl acetal resin. Conditions for leaving the resin are not particularly limited, and in consideration of elution of a metal component from a metal can, a current collector, etc., examples of the conditions are as follows: half a day to two days at a room temperature; several hours to one day at 45° C.; and one to several hours at 60° C.

[Electrochemical Device]

The electrochemical device of the invention is characterized in that it includes a negative electrode, a separator, a positive electrode, and a nonaqueous electrode solution and that the negative electrode and/or positive electrode and the separator are adhered to each other with an adhesive layer made of a cross-linked material of the polyvinyl acetal resin. Among such electrochemical devices, preferred is an electrochemical device in which the adhesive layers are formed between both of the negative electrode and positive electrode and the separator.

The adhesive layer may be formed so as to cover entire surfaces of the negative electrode and separator or the positive electrode and separator, or formed on a part thereof in a given pattern.

In the electrochemical device of the invention, a content of the cross-linked material of the polyvinyl acetal resin is preferably 3.5 wt % or less, more preferably 0.3 to 3.5 wt %, and particularly preferably 0.5 to 2.5 wt % based on an entire total amount of the nonaqueous electrolyte solvent, the electrolyte, and the cross-linked material. The content within the above range is particularly effective for prevention of deterioration of the characteristics exhibiting as the electrochemical device and for prevention of deterioration of the adhesive strength of the laminate composed of the negative electrode, separator, and positive electrode. Note that the cross-linked material of the polyvinyl acetal resin to which the acid denaturation has been applied is more desirable than that of the polyvinyl acetal resin to which no acid denaturation has been applied, because the former cross-linked material enhances the adhesiveness between the electrode and the separator.

Since even an extremely small additive amount of the cross-linked material of the polyvinyl acetal resin can give sufficient shape-retaining property to the electrochemical device, the cross-linked material will not disturb the movement of ions between the positive electrode and the negative electrode. In other words, the use of a small amount of the cross-linked material is able to give sufficient shape-retaining property to the electrochemical device and therefore, a decrease of ion conductivity attributable to the presence of the cross-linked material can be minimized, thus resulting in the electrochemical device which is excellent in charging/discharging load characteristics. Further, the cross-linked material is not fused or dissolved in the nonaqueous electrolyte solution even when the electrochemical device is brought under a high temperature, resulting in no risk of causing the adhesive strength to be deteriorated, and it is thus possible to obtain the electrochemical device which is excellent in shape-retaining property in a wide range of temperature and also excellent in high-temperature storage property.

The electrochemical device of the invention contains the nonaqueous electrolyte solution of the invention. However, the polyvinyl acetal resin in the nonaqueous electrolyte solution has been the cross-linked material by the energization at the charging step. The polyvinyl acetal resin which has been acid-denatured, more easily becomes the cross-linked material by the electrolytic oxidation through the energization, compared to the polyvinyl acetal resin which has not been acid-denatured. Further, the adhesive strength of the non-aqueous electrolyte solution containing the acid-denatured material of the polyvinyl acetal resin is higher than that of the nonaqueous electrolyte solution containing the polyvinyl acetal resin which has not been acid-denatured, with the result that, compared to the nonaqueous electrolyte solution containing the polyvinyl acetal resin which has not been acid-denatured, a smaller amount of the nonaqueous electrolyte solution containing the acid-denatured material of the polyvinyl acetal resin can enhance the mechanical strength, shape-retaining property, high-temperature storage property, etc., of the electrochemical device. Further, the content of the acid-denatured material can be very small and therefore, even when gelation of the nonaqueous electrolyte solution is caused in cross-linking caused by the energization, no such gelation as to disturb the movement of ions occurs, thus resulting in an advantage that the ion conductivity of the nonaqueous electrolyte solution does not decrease so much to a degree at which practical troubles arise so that the electrochemical device can be obtained which is excellent in electrical load characteristics and charging/discharging characteristics.

The negative electrode used in the electrochemical device of the invention contains a negative electrode active material and a negative electrode current collector. As the negative electrode active material, one or two or more of the materials may be appropriately selected from the materials which have been regularly used conventionally in this field, according to the type of the electrochemical device. The negative electrode current collector includes, for example, copper, nickel, stainless steel, aluminum, and titanium.

The negative electrode can be created according to a method in which a composition containing a negative electrode active material and a binder is formed into a desired shape and then adhered to the negative electrode current collector; a method in which a solvent is further added to a composition containing a negative electrode active material and a binder, to thereby form negative electrode mix slurry which is then applied to one surface of the negative electrode current collector, followed by drying, and according to need, the press is performed under pressure to enhance packing concentration of the negative electrode active material; and a method in which a negative electrode active material or a negative electrode active material covered with a binder is formed into a desired shape by roll forming, compression molding, or the like method.

As the binders used in these methods, it is possible to use the binders which are regularly used in this field, including, for example, fluorine resin, celluloses, latexes such as rubber. As the solvent, it is also possible to use the solvents which are regularly used in this field, including, for example, water, N-methylpyrrolidone, dimethylacetamide, dimethylformamide, propylenecarbonate, γ-butyrolactone, and N-methyloxazolidinone. The solvent can be used alone, or according to need, two or more of the solvents can be used in combination.

Note that the negative electrode is preferred which is obtained by enhancing the packing concentration of active material in a negative electrode material layer and then providing the negative electrode material layer with a covering layer containing the above-mentioned polyvinyl acetal resin. The use of such a negative electrode can prevent a side reaction from arising on a surface of the negative electrode and thus increase capacity of resultant electrochemical device as an electrochemical device.

The positive electrode used in the electrochemical device of the invention is composed of a positive electrode active material and a positive electrode current collector. As the positive electrode active material, one or two or more of the materials may be appropriately selected from the materials which are regularly used in this field, according to the type of the electrochemical device. The positive electrode current collector includes a metal whose surface will be coated with a passivation film through anodic oxidation in the nonaqueous electrolyte solution, such as Al, Ti, Zr, Hf, Nb, Ta, or alloy containing two or more of these ingredients, for example. The positive electrode may contain a conductive aid. As the conductive aid, it is possible to use known materials including, for example, carbon black, amorphous whisker, and graphite. The positive electrode can be manufactured in the same manner as the above-described manufacturing method of the negative electrode, except that the negative electrode active material is replaced with the positive electrode active material and that the negative electrode current collector is replaced with the positive electrode current collector.

As the separator used in the electrochemical device of the invention, it is possible to use various types of known films which electrically insulate the positive electrode and the negative electrode and through which ions permeate, and preferably used is a porous film. A material of the porous film includes, for example, polyolefin, polyimide, polyvinylidene fluoride, and polyester. A shape of the microporous film includes a microporous film and a nonwoven fabric. The separator of the invention is preferably a porous polyolefin film and particularly preferred are, for example, a porous polyethylene film, a porous polypropylene film, or a multi-layer film composed of porous polyethylene film and porous polypropylene film. A surface of the porous film may be coated with other resin which is excellent in thermostability.

The electrochemical device of the invention includes, for example, batteries such as a lithium secondary battery, a lithium primary battery, a magnesium battery, and a calcium battery; and capacitors such as an aluminum electrolytic capacitor, an electric double layer capacitor, and an electrochemical capacitor.

The electrochemical device of the invention is excellent in electrical load characteristics, charging/discharging characteristics, shape-retaining property, and high-temperature preservation stability, and exhibits high mechanical strength as described above. Further, the electrochemical device of the invention can be easily reduced in thickness and even in a long-term use, it can keep sufficient electrical load characteristics and charging/discharging characteristics without risk of causing troubles of leak and damage, thus resulting in no need to provide a special structure for preventing these troubles.

[Method of Manufacturing Electrochemical Device]

The electrochemical device of the invention is obtained in a manner that the laminate composed of the negative electrode, separator, and positive electrode is impregnated with the nonaqueous electrolyte solution containing the polyvinyl acetal resin component, and then the polyvinyl acetal resin is formed into the cross-linked material by the electrolytic oxidation through the energization at the charging step. The most significant feature of the manufacturing method of the invention is to cross-link the polyvinyl acetal resin triggered by the charging operation, which cross-link will help the negative electrode and/or positive electrode and the separator to be adhered to each other. In this case, the polyvinyl acetal resin component indicates a) the polyvinyl acetal resin or b) a mixture of the polyvinyl acetal resin and the compound for producing acid.

The method of manufacturing the electrochemical device of the invention employs a generally-used method of manufacturing an electrochemical device, in which a laminate containing a negative electrode, a separator, and a positive electrode is housed in a casing of an electrochemical device, and a nonaqueous electrolyte solution is injected into the laminate, followed by hermetically closing the casing and then applying the initial charging and aging. In the method of the invention, the nonaqueous electrolyte solution of the invention is used as the electrolyte solution. The polyvinyl acetal resin contained in the nonaqueous electrolyte solution is cross-linked by the energization at the initial charging step, thus manufacturing the electrochemical device of the invention.

The polyvinyl acetal resin may either have been acid-denatured or not acid-denatured, and in consideration of easiness of cross-link of the polyvinyl acetal resin at the energizing step, thus providing high adhesiveness between the negative electrode and the separator and/or between the positive electrode and the separator, it is desired that the polyvinyl acetal resin have been acid-denatured. In the case where the polyvinyl acetal resin has not been acid-denatured, the nonaqueous electrolyte solution is made so as to contain the compound for producing acid, thereby producing acid in the nonaqueous electrolyte solution at the charging step and the aging step, which causes the polyvinyl acetal resin to be acid-denatured and thus makes it more liable to cause the cross-link.

According to the manufacturing method of the invention, it is possible to obtain the electrochemical device of which components have the equal or higher adhesive strength with a far smaller amount of the polyvinyl acetal resin, as compared to the conventional gel-typed polyelectrolyte. Furthermore, even when the polyvinyl acetal resin is cross-linked to thus cause gelation of the nonaqueous electrolyte solution, the extremely small amount of the cross-linked material will hardly disturb the movement of ions in the nonaqueous electrolyte solution and therefore, the high ion conductivity inherent in the nonaqueous electrolyte solution is sufficiently exercised, thus resulting in the electrochemical device which is excellent in electrical load characteristics.

Note that the following methods can be mentioned, for example, as methods for obtaining an electrochemical device having a similar constitution, which are not preferred. In a method where the nonaqueous electrolyte solution is injected after the electrode and the separator are adhered to each other with an adhesive, it is very difficult to inject the nonaqueous electrolyte solution. Further, in a method where the nonaqueous electrolyte solution is injected into the separator to adhere the electrode and the separator to each other after the electrode and the separator are coated with the adhesive that does not exhibit the adhesiveness unless swelled in the nonaqueous solution, a high swelling property of the adhesive in the nonaqueous electrolyte solution will cause the adhesive to be dissolved in the nonaqueous solution when left under a high temperature or stored for a long period of time, thus leading deterioration in adhesiveness.

The manufacturing method of the invention is employed in an ordinary process for fabricating the electrochemical device, and there is no need to add a new process, with the result that a generally-used equipment for manufacturing an electrochemical device can be utilized without change, thus achieving a simple manufacturing process.

1) Step for Injecting Nonaqueous Electrolyte Solution into Laminate Composed of Negative Electrode, Separator, and Positive Electrode In the invention, first of all, the negative electrode, the separator, and the positive electrode are laminated. The laminate may be formed into any shape according to need, including a cylindrical shape, a coin-like shape, a square shape, and a film-like shape, and is housed in a casing for electrochemical device such as a bag made of a metal can or a metal laminate film. The nonaqueous electrolyte solution of the invention is injected into the laminate. In injecting, it is possible to employ a generally-used injecting method for non-aqueous electrolyte solution.

Note that an acid content of the nonaqueous electrolyte solution is preferably kept small until the nonaqueous electrolyte solution is injected into the laminate since the non-aqueous electrolyte solution needs to be fluid so as to be injected into the laminate. In this case, "acid" mentioned above is not a compound for producing acid, but acid for gradually transforming an acid-denatured material. Chiefly, the acid is contained as an impurity in each component contained in the nonaqueous electrolyte solution, as represented by hydrogen fluoride. To be specific, it is preferred that the acid content in the nonaqueous electrolyte solution be usually 20 mmol/l or less, preferably 5 mmol/l or less, and further preferably 2 mmol/l or less. A large acid content may cause the acid-denatured material to be cross-linked or transformed before the injection of the nonaqueous electrolyte solution into the laminate, which increases the viscosity of nonaqueous electrolyte solution and thus becomes hard to be injected into the laminate.

Further, the polyvinyl acetal resin may be existent in the laminate, for example, between the negative electrode and the separator, between the positive electrode and the separator, and inside the separator, into which laminate a nonaqueous electrolyte solution may be injected containing components other than the polyvinyl acetal resin (i.e., a nonaqueous electrolyte solution obtained by adding to the solvent the electrolyte and, according to need, the compound for producing acid). The polyvinyl acetal resin can be used in form of beads, particles, pellet, or sheet or film which contains the polyvinyl acetal resin. In these cases, the polyvinyl acetal resin does not have to be dissolved in the nonaqueous electrolyte solution, resulting in no increase in the viscosity of nonaqueous electrolyte solution which can be thus injected into the laminate easily. This makes it possible to easily obtain the electrochemical device. Also in these cases, it is preferred that the acid content in the nonaqueous electrolyte be set within the above-stated range.

Further, a coving layer containing the polyvinyl acetal resin may be formed on a surface of negative electrode active material layer of the negative electrode, on both sides or one side of the separator, or on a surface of positive electrode active material layer of the positive electrode. This also simplifies the manufacture of electrochemical device of the invention. The covering layer can be formed in accordance with a known method by applying to a surface where the covering layer is to be formed, the solution or slurry which is obtained by dissolving or dispersing the polyvinyl acetal resin in the organic solvent, or the varnish of the invention, followed by the removal of the organic solvent through heating, etc. Usable organic solvent includes known ingredients which do not cause the negative electrode material or positive electrode material to corrode and in which the acid-denatured material of the polyvinyl acetal resin can be evenly dissolved or dispersed, including, for example, propylene carbonate, ethylene carbonate, N-methylpyrrolidinone, dimethylformamide, and γ-butyrolactone. Further, it is possible to use a method in which the polyvinyl acetal resin is sprayed, a method in which the polyvinyl acetal resin is spattered, a method in which the polyvinyl acetal resin is bonded under pressure, or the like method. Furthermore, the polyvinyl acetal resin may be used to constitute a part or all of the binder for forming the active material layer, and the polyvinyl acetal resin may be contained in the negative electrode active material layer.

In the case where the polyvinyl acetal resin is existent in the laminate composed of the negative electrode, the separator, and the positive electrode, a usage of the polyvinyl acetal resin may be appropriately selected according to inner volume, porosity, fluid volume of the nonaqueous electrolyte solution, etc. of the electrochemical device. An extremely small usage of the polyvinyl acetal resin may lead a decrease in adhesiveness while an extremely large usage thereof may disturb the movement of ions in the nonaqueous electrolyte solution.

In the case where the covering layer of the polyvinyl acetal resin is formed on the surface of the negative electrode material layer of the negative electrode, the electrolysis of the nonaqueous electrolyte solution is prevented from occurring secondarily on the surface of the negative electrode active material, resulting in enhancement in a charging/discharging efficiency at the time of initial charging/discharging for the negative electrode and thus obtaining an effect of increasing the capacity of electrochemical device. The reason is not clear enough, but speculated that this is based on the prevention of the nonaqueous solvent molecules from being spread to the surface of negative electrode material layer or based on the stabilization of a protective layer formed on the surface of negative electrode material layer at the time of initial charging. The effect becomes further notable by forming the covering layer containing the polyvinyl acetal resin after enhancement in the packing concentration of the negative electrode active material. The method for enhancing the packing concentration includes, for example, a method in which the negative electrode is pressed under pressure, a method in which a particle distribution of the negative electrode active material is selected so as to achieve the closest packing, and a method in which a forming rate, supply rate, etc. of the negative electrode active material is controlled to enhance the packing concentration in forming the negative electrode active material layer through a plating method or a CVD method. As an indicator of the packing concentration in the negative electrode active material layer, porosity is used, for example. The lower the porosity is, the higher the packing concentration is. In the invention, the packing concentration may be enhanced so that the porosity of the negative electrode active material layer is 0.05 to 0.95, preferably 0.1 to 0.9, and more preferably 0.1 to 0.5. Note that in the case of giving priority to prevention of the electrolysis of the nonaqueous electrolyte solution, the usage of the polyvinyl acetal resin is 0.5 to 20 mg and preferably 1 to 5 mg per square meter surface area of the negative electrode active material layer.

Note that the porosity mentioned in the invention is a value obtained by $(V1-V0)/V1$ wherein V1 represents volume of a solid and V0 represents volume of the solid divided by a real concentration.

2) Step for Cross-linking Polyvinyl Acetal Resin Through Charging

The electrochemical device of the invention which is hermetically closed after the injection of the nonaqueous electrolyte solution into the laminate as described above, is provided at the initial charging step and the aging step which aims to stabilize the characteristics and to identify defects of the electrochemical device.

When the nonaqueous electrolyte solution is injected into the laminate, the polyvinyl acetal resin is existent in a state of dissolving or swelling in the nonaqueous electrolyte solution, so that the electrode and the separator are not adhered to each other. The energization at the initial charging step causes the polyvinyl acetal resin to be cross-linked, thereby adhering the electrode and the separator to each other. At this time, in the case where the nonaqueous electrolyte solution of the invention contains the compound for producing acid, the cross-linking of the polyvinyl acetal resin proceeds more smoothly, resulting in occurrence of the acid denaturation and cross-linking of the polyvinyl acetal resin.

In order to cause the polyvinyl acetal resin to be cross-linked, the charging needs to be performed at the charging step so that the positive electrode of the electrochemical device has a potential of 3 V or more and preferably 3.8 V or more relative to a dissolution/deposition battery of lithium. An electric quantity for the energization is not particularly limited and may be appropriately selected so that the reaction of electrolytic oxidation of 100 coulomb or more per kilogram occurs in the polyvinyl acetal resin.

In the case where the nonaqueous electrolyte solution contains a compound for producing acid, the electrochemical device may be warmed at the initial charging step and the aging step. The warming of the electrochemical device promotes the production of acid and makes the cross-linking of the polyvinyl acetal resin more smoothly proceed. The warming at this occasion is performed so as not to deteriorate the electrochemical device. Specific conditions for warming include, for example, at 45° C. for 0.5 to thirty days (preferably one to seven days) and at 60° C. for one hour to seven days (preferably 5 hours to three days).

Note that in the electrochemical device, the cross-linked material of the polyvinyl acetal resin may become insoluble in the nonaqueous solvent by the cross-link, and be thus existent in a state of being separable from the nonaqueous solvent by simple separation means including filtration or centrifugal separation, for example, or alternatively, the cross-linked material of the polyvinyl acetal resin may be insoluble in the nonaqueous solvent but almost evenly dispersed in the nonaqueous solvent to thus cause gelation of the nonaqueous solvent. The enhancement of the adhesive strength of the laminate composed of the negative electrode, the separator, and the positive electrode can be used to secondarily check whether or not the polyvinyl acetal resin is cross-linked in the electrochemical device.

In order to enhance the adhesive strength of the laminate, it is preferred that the cross-linked material of the polyvinyl acetal resin be existent selectively in an interface between the negative electrode and the separator and in an interface between the positive electrode and the separator. In the case of employing such a structure, assuming that W1 (g) represents an amount of the nonaqueous electrolyte solution containing the cross-linked material and W2 (g) represents an amount of a filtrate from which the cross-linked material has been separated and thus removed by filtration, a percentage value (W2/W1×100) of a value obtained by dividing W2 by W1 is preferably 20% or more, more preferably 40% or more, and particularly preferably 60% or more. An upper limit of the percentage value is determined by the content of the acid-denatured material in the nonaqueous electrolyte solution. In order to have the cross-linked material of the polyvinyl acetal resin be existent as many as possible in the interface between the negative electrode and the separator and in the interface between the positive electrode and the separator, it is preferred that the polyvinyl acetal resin be cross-linked promptly after the electrolytic oxidation of the polyvinyl acetal resin on the surface of the electrode. For example, immediately after charging the electrochemical device, the electrochemical device may be warmed at as high a temperature as possible so as not to deteriorate the characteristics of the electrochemical device. It is desired that the temperature for the warming be 40° C. to 90° C. and preferably 50° C. to 60° C. The length of time for the warming may be determined in consideration of influences on the battery characteristics.

[Lithium Battery]

As one mode of the electrochemical device of the invention, a lithium battery is given. The lithium battery is a battery in which the nonaqueous electrolyte solution is injected into the laminate composed of the negative electrode, positive electrode, and separator where the negative electrode and the separator are adhered and/or the positive electrode and the separator are adhered to each other with the cross-linked material of the polyvinyl acetal resin. It is characterized that the nonaqueous electrolyte solution contains a lithium salt as the electrolyte, and the negative electrode contains a negative electrode active material which is capable of occluding and/or releasing a lithium metal or lithium.

The negative electrode is composed of a negative electrode active material and a negative electrode current collector. As the negative electrode active material, it is possible to use known compounds which are capable of occluding and/or releasing a lithium metal or lithium, including, for example, lithium, lithium-containing alloy, silicon which is capable of being alloyed with lithium, silicon alloy, tin, tin alloy, tin oxide which is capable of occluding and releasing lithium, oxide silicon, transition metal oxide which is capable of occluding and releasing lithium, transition metal nitride which is capable of occluding and releasing lithium, and a carbon material which is capable of occluding and releasing lithium. These negative electrode active materials can be used each alone or two or more of the negative electrode active materials can be used in combination. As the negative electrode current collector, it is possible to use ingredients regularly used in this field, including, for example, copper, nickel, and stainless steel.

The negative electrode can be fabricated in a manner, for example, that the negative electrode active material is evenly mixed with a binder such as polyvinylidene fluoride, carboxymethyl cellulose, latex, and a cross-linking polymeric material, and a thus-obtained mixture is applied onto the negative electrode current collector, followed by drying, and then preferably subjected to pressing for enhancing a packing concentration of the negative electrode active material. Among the negative electrodes, preferred is a negative electrode which is provided with a covering layer containing the polyvinyl acetal resin on the surface of the negative electrode active material layer after the enhancement of the packing concentration of the negative electrode active material in the negative electrode active material layer.

The positive electrode is composed of a positive electrode active material and a positive electrode current collector. As the positive electrode active material, it is possible to use ingredients regularly used in this field, including, for example, transition metal oxide or transition metal sulfide such as $FeS_2$, $MoS_2$, $TiS_2$, $MnO_2$, and $V_2O_5$; composite oxide made of lithium such as $LiCoO_2$, $LiMnO_2$, $LiMn_2O_4$, $LiNiO_2$, $LiNi_xCo_{(1-x)}O_2$, and $LiNi_xCo_yMn_{(1-x-y)}O_2$, and a transition metal; a conductive polymeric material such as polyaniline, polythiophene, polypyrrole, polyacetylene, polyacene, and a dimercaptothiadiazole-polyaniline complex; a carbon material such as fluorinate carbon and activated carbon. Among these ingredients, preferred is an active material which can generate electromotive force of 3 V or more and preferably 3.8 V or more relative to a lithium dissolution/deposition potential, and particularly preferred is composite oxide made of lithium and transition metal. The positive electrode active materials can be used each alone or two or more of the positive electrode active materials can be used in combination. When the positive electrode material exhibits the electromotive force of 3 V or more relative to the lithium dissolution/deposition potential, the polyvinyl acetal resin is sufficiently subjected to the electrolytic oxidation, with the result that the cross-linking of polyvinyl acetal resin proceeds more easily. As the positive electrode current collector, it is possible to use a current collector which is regularly used in this field.

The positive electrode can be fabricated in a manner, for example, that the positive electrode active material is evenly mixed with a binder such as polyvinylidene fluoride, polytetrafluoroethylene, and a cross-linking polymeric material, and a thus-obtained mixture is applied onto the positive electrode current collector, followed by drying, and then preferably subjected to pressing for enhancing a packing concentration of the positive electrode active material. It is possible to use together with the positive electrode active material a conductive aid including carbon black, amorphous whisker, and graphite.

As the separator, it is possible to use a separator of the same sort as that stated in the section regarding the electrochemical device of the invention.

The nonaqueous electrolyte solution for lithium battery contains a lithium salt which is electrolyte, and polyvinyl acetal resin varnish.

As the lithium salt, it is possible to use an ingredient which is regularly used as electrolyte for lithium battery, including, for example, a lithium salt such as $LiPF_6$, $LiBF_4$, $LiClO_4$, $LiAsF_6$, $Li_2SiF_6$, $LiOSO_2C_kF_{(2k+1)}$ (k=integer of 1 to 8), $LiPF_n(C_kF_{(2k+1)})_{(6-n)}$ (n=integer of 1 to 5 and k=integer of 1 to 8), $LiC(SO_2R^5)(SO_2R^6)(SO_2R^7)$, $LiN(SO_2OR^8)(SO_2OR^9)$, and $LiN(SO_2R^{10})(SO_2R^{11})$ ($R^7$ to $R^{13}$ are the same or different, which shows a perfluoroalkyl group having a carbon number of 1 to 8). Among these ingredients, preferred are $LiPF_6$, $LiBF_4$, and $LiN(SO_2R^{10})(SO_2R^{11})$ ($R^{10}$ and $R^{11}$ are as mentioned above), and particularly preferred are $LiPF_6$ and $LiBF_4$. It is possible to use one or two or more of these lithium salts. A content of the lithium salt in the nonaqueous electrolyte solution is 1 to 3 mol/liter and preferably 0.5 to 2 mol/liter.

The polyvinyl acetal resin varnish is obtained by dissolving the polyvinyl acetal resin in a carbonate ester solvent. The carbonate ester solvent is most suitable as a solvent for the electrolyte solution for lithium secondary battery in view of its electrochemical stability (redox stability) and chemical stability, and thus used as a main solvent.

The carbonate ester used in the nonaqueous electrolyte solution includes cyclic carbonate ester and chain carbonate ester. The cyclic carbonate ester includes, for example, cyclic carbonate such as ethylene carbonate, propylene carbonate, butylene carbonate, fluoroethylene carbonate, and trifluoroethylene carbonate. Chain carbonate ester, for example, chain carbonate such as dimethyl carbonate, ethyl methyl carbonate, methyl propyl carbonate, methyl trifluoroethyl carbonate, di-trifluoroethyl carbonate, diethyl carbonate, dibutyl carbonate, and methyl octyl carbonate. Other than carbonate ester, carboxylic acid ester is also suitable and can be thus contained in the electrolyte solution. The carboxylic acid ester includes cyclic carboxylic acid ester such as γ-butyrolactone; and chain carboxylic acid ester such as methyl acetate, methyl propionate, pentafluoropropyl acetate, and trifluoromethyl acetate. It is possible to use one or two or more of the carbonate esters given above as examples, but in view of the aim to enhance the load characteristics, low-temperature characteristics, etc. of the resultant battery, it is preferable to use the cyclic carbonate ester and the chain carbonate ester in combination. A mixing ratio (cyclic carbonate:chain carbonate) between the cyclic carbonate ester and the chain carbonate ester is, based on weight ratio, 5:95 to 80:20, preferably 10:90 to 70:30, and more preferably 15:85 to 55:45. By setting the ratio to such a range, a dissociation degree of the electrolyte can be enhanced while the viscosity of the nonaqueous electrolyte solution is prevented from rising, so that the conductivity of nonaqueous electrolyte solution involving the charging/discharging characteristics of the battery can be enhanced, thus allowing the solubility of the nonaqueous electrolyte to be kept high. As a result, it is possible to obtain a nonaqueous electrolyte solution which is excellent in electric conductivity at an ordinary temperature or low temperature, thus allowing enhancement of the charging/discharging load characteristics of the battery at an ordinary temperature or low temperature. Further, taking into consideration that the solvent composition is adjusted to raise an ignition point of the solvent and thus the battery is enhanced in safety, it is preferred that the cyclic ester be used alone or that a mixed amount of the chain ester be set at 20 wt % or less based on a total amount of the nonaqueous solvent. As the cyclic ester to be used in this case, preferred are ethylene carbonate, propylene carbonate, γ-butyrolactone, and a mixture of two or more of these ingredients. As the chain ester, chain carbonate is preferred.

Further, cyclic carbonates having a vinyl group may be used in combination with the above-stated esters. This prevents a reductive degradation reaction from occurring in the nonaqueous electrolyte solution on the negative electrode, thus leading further enhancement of high-temperature storage property, cycle charging/discharging property, etc. of the battery. As the carbonates having a vinyl group, known ingredients can be used including, for example, vinylene carbonate, methylvinylene carbonate, ethylvinylene carbonate, propylvinylene carbonate, phenylvinylene carbonate, dimethylvinylene carbonate, diethylvinylene carbonate, dipropylvinylene carbonate, diphenylvinylene carbonate, vinylethylene carbonate, and 4,5-divinylethylene carbonate. Among these ingredients, preferred are vinylethylene carbonate, divinylethylene carbonate, and vinylene carbonate, and particularly preferred is vinylene carbonate. It is possible to use one or two or more of the cyclic carbonates each having a vinyl group. As the combination in the case of using two or more of the cyclic carbonates, preferred are vinylene carbonate and vinylethylene carbonate; and vinylene carbonate and divinylethylene carbonate. A content of the cyclic carbonate having a vinyl group is 0.1 to 10 wt % and preferably 0.5 to 5 wt % based on a total amount of the nonaqueous electrolyte solution.

The nonaqueous electrolyte solution for lithium battery may contain a solvent, an additive, etc., which are not stated above, to a degree that its characteristics are not impaired. It may contain, for example, ethers, amides, carbamates, ureas, phosphate esters, aromatic hydrocarbons, and fluorinated ethers.

The lithium battery of the invention can be manufactured according to the above-described method by using the above-described negative electrode, separator, and positive electrode for lithium battery and the nonaqueous electrolyte solution of the invention containing a lithium salt as electrolyte.

As the nonaqueous electrolyte solution used in this case, preferred is a nonaqueous electrolyte solution obtained by adding to the above-stated polyvinyl acetal resin varnish a lithium salt (electrolyte) and Lewis acid and/or Lewis acid salt each having a halogen atom, each of which is a compound for producing acid through a reaction with water. As the lithium salt, it is possible to use the same amount of lithium salt of the same sort as that used in the nonaqueous electrolyte solution for lithium battery. Also as the polyvinyl acetal resin varnish, it is possible to use the above-stated varnish. Among such varnish, preferred is varnish made of the acid-denatured material of the polyvinyl formal resin. A content of the polyvinyl acetal resin in the nonaqueous electrolyte solution is 3.5 wt % or less, preferably 0.3 to 3.5 wt %, and more preferably 0.5 to 2.5 wt % based on a total amount of the nonaqueous electrolyte solution. By setting the content within this range, influences on the charging/discharging load characteristics is minimized, thus resulting in a lithium battery which is excellent in shape-retaining property.

Also as the Lewis acid or Lewis acid salt each having a halogen atom, it is possible to use the above-stated Lewis acid or Lewis acid salt. Among such Lewis acids or Lewis acid salts, preferred is Lewis acid or Lewis acid salt each having a fluorine atom. For example, preferred are $LiPF_6$ and $LiBF_4$ each of which has also a function as an electrolyte salt. Further, in order to enhance a cross-linking rate in the nonaqueous electrolyte solution, preferred is Lewis acid or Lewis acid salt, of which acid-producing rate is high. Among such Lewis acids and Lewis acid salts, $SiF_nR_{(4-n)}$ (n=1 to 4, and R represents an organic group) is further preferred in consideration of easiness of handling, availability of a high-purity product, stability in the electrolyte solution, an acid-producing rate, etc. Specific examples of $SiF_nR_{(4-n)}$ include trimethylsilyl fluoride, triphenylsilyl fluoride, dimethylsilyl difluoride, diphenylsilyl difluoride, methylsilyl trifluoride, and phenylsilyl trifluoride, and particularly preferred is trimethylsilyl fluoride. Note that in the case of using $SiF_nR_{(4-n)}$, $SiF_nR_{(4-n)}$ is added directly to the nonaqueous electrolyte solution, or alternatively, a compound is added which changes into $SiF_nR_{(4-n)}$ in the nonaqueous electrolyte solution. The compound which changes into $SiF_nR_{(4-n)}$ in the nonaqueous electrolyte solution, includes various types of silylester. Among such silylesters, preferred is phosphoric silylester. Phosphoric silylester not only produces $SiF_nR_{(4-n)}$, but also has a property of causing gelation of a liquid containing the polyvinyl acetal resin varnish through an action with a dehydration agent. Since no energization occurs in the nonaqueous electrolyte solution located not within an electrode laminate inside a battery, the cross-linking of the acid-denatured material is hard to occur, but the addition of phosphoric silylester to the nonaqueous electrolyte solution will moderately cause gelation of the nonaqueous electrolyte solution to gel, thus increasing an effect of leak prevention. The Lewis acids or Lewis acid salts each having a halogen atom can be used each alone, and two or more of the Lewis acids or Lewis acid salts can be used in combination. A content of the Lewis acid or Lewis acid salt each having a halogen atom is 0.01 to 10 wt % and preferably 0.05 to 2 wt % based on the total amount of the nonaqueous electrolyte solution.

The lithium battery of the invention may be formed into any shape including a cylindrical shape, a coin-like shape, a square shape, and a film-like shape. However, the basic structure of battery is the same regardless of the shape, and the design can be changed in accordance with its purpose.

The lithium battery of the invention can be used in the same application as a conventional lithium battery. For example, it can be used in various household electronic appliances which include, particularly, a cell-phone, a mobile, a laptop computer, a camera, a portable video recorder, a portable CD player, and a portable MD player.

EXAMPLE

The invention will be specifically described hereinbelow by using examples, but the invention is not limited thereto. Hereinbelow, "%" and "part" represent "% by weight" and "part by weight" unless otherwise stated. Further, "V/V" represents a volume ratio.

Synthesis Example 1

Synthesis Example of Polyvinyl Acetal Resin

Polyvinyl acetate was alkali-saponified into polyvinyl alcohol resin (saponified degree: 89%, mean degree of polymerization: 800). After 25 g of the polyvinyl alcohol, 200 ml of 50% acetate solution, and 40 ml of 10% hydrochloric acid are mixed with each other, 100 ml of formalin (37% formaldehyde solution) was added to a thus-obtained mixture and thus kept under a reaction at 30° C. for five hours. After completion of the reaction, diluted acetic acid was added to the reaction liquid to have a reactant deposited therein, and a deposit was obtained by filtration and neutralized with sodium hydroxide, washed with water, and then dried, resulting in polyvinyl formal. A composition ratio of thus-obtained solid was analyzed on the basis of JIS K6729 "Testing methods for polyvinyl formal", with the result that the solid was determined as polyvinyl formal resin composed of 82.5% vinyl formal unit (R1=hydrogen atom in the general formula (1)), 5.9% vinyl alcohol unit (2), and 11.6% vinyl acetate unit ($R_2$=methyl group in the general formula (3)). A concentration of hydroxyl group obtained by conversion based on the composition ratio of the vinyl alcohol unit (2) in the polyvinyl formal resin was 1.34 mol/kg.

In the same manner, the polyvinyl alcohol resin having a mean degree of polymerization of 800 was replaced with polyvinyl alcohol resin of which molecular weight was various, resulting in polyvinyl formal resin of which molecular weight was various. Respective chemical compositions thereof were almost the same as that of the above polyvinyl formal resin.

Further, in the same manner, formalin was replaced with acetaldehyde, propionaldehyde, or butylaldehyde, thus resulting in polyvinyl acetacetal resin, polyvinyl propyral resin, or polyvinyl butyral resin. A chemical composition of the resin was composed of 72 wt % vinyl acetal part, 16 wt % polyvinyl acetate part, and 12 wt % vinyl alcohol part.

Synthesis Example 2

Acid Denaturation Example of Polyvinyl Acetal Resin

The polyvinyl formal resin (of which mean degree of polymerization was 800) obtained in the same manner as the synthesis example 1 was dissolved in a 100 ml mixed solvent containing ethylene carbonate and ethylmethyl carbonate at 2:1 (volume ratio) so that a concentration of the polyvinyl formal resin reached 5%, and 0.01% sulfuric acid was then added to a thus-obtained solvent, followed by heating treatment (acid-denaturizing treatment) at 45° C. for 144 hours, thus resulting in a solution containing an acid-denatured material of the polyvinyl formal resin.

The fact that the polyvinyl acetal resin had been acid-denatured was determined by a change in concentration of protons appearing at 4.28 ppm in an NMR spectrometer (trade name: JNM-A500 (500 MHz) manufactured by JEOL Ltd.) between a value obtained before the acid-denaturizing treatment and a value obtained after the acid-denaturizing treatment. In the measurement, DMSO-$d^6$ serving as a solvent was used as a shift standard (2.49 ppm) while tetrachloroethane was used as an internal standard. The concentration of protons appearing at 4.28 ppm was, per kilogram of the polyvinyl formal resin, 0.3 mol before the acid-denaturizing treatment and 0.1 mol after the acid-denaturizing treatment. The decrease in concentration of protons was used to determine that the polyvinyl formal resin had been acid-denatured.

Test Example 1

Relation Between Solvent Composition and Solubility of Polyvinyl Acetal Resin

The polyvinyl formal resin obtained in the synthesis example 1 was dried at 80° C. under reduced pressure, thus fabricating polyvinyl formal resin of which water content was 20 ppm. Further, as a nonaqueous solvent, EC (ethylene carbonate) or PC (propylene carbonate) was used as cyclic carbonate ester while DMC (dimethyl carbonate), EMC (ethyl methyl carbonate), or DEC (diethyl carbonate) was used as chain carbonate ester. The nonaqueous solvent was respectively dried with molecular sieves so that the water content contained therein was adjusted to 20 ppm or less. The polyvinyl formal resin and the nonaqueous solvent obtained as above were mixed with each other at an appropriately modified ratio, and stirred at 45° C. for 10 hours, thus resulting in polyvinyl formal resin varnish. Solubility and viscosity of thus-obtained varnish were measured. As Reference examples, varnish was prepared respectively using, instead of the polyvinyl formal resin, polyvinyl propyral, polyvinyl acetacetal, and polyvinyl butyral which were obtained in the synthesis examples. The result is shown in Table 1. In the section of type of polyacetal resin, "H" represents polyvinyl formal; "P" represents polyvinyl propyral; "A" represents polyvinyl acetacetal resin; and "B" represents polyvinyl butyral.

Further, regarding the evaluation criteria of the solubility, "Good" means soluble; "Not bad" means partially soluble; and "Poor" means insoluble.

TABLE 1

| No. | | Polyvinyl acetal resin | | Nonaqueous solvent | Solvent mixing ratio V/V | Solubility | Varnish viscosiy mPa/cm |
|---|---|---|---|---|---|---|---|
| | | Type | Mean degree of polymerization | Concentration wt % | | | |
| Example 1 | 1 | H | 500 | 5 | EC + MEC | 1:1 | Good | 10 |
| | 2 | H | 500 | 10 | EC + MEC | 1:1 | Good | 185 |
| | 3 | H | 500 | 5 | EC + MEC | 1:4 | Good | 9 |
| | 4 | H | 700 | 5 | EC + MEC | 1:3 | Good | 10 |
| | 5 | H | 700 | 5 | EC + MEC | 1:2 | Good | 12 |
| | 6 | H | 700 | 5 | EC + MEC | 1:1 | Good | 14 |
| | 7 | H | 700 | 5 | EC + MEC | 2:1 | Good | 25 |
| | 8 | H | 700 | 5 | EC + MEC | 3:1 | Good | 35 |
| | 9 | H | 700 | 5 | EC + MEC | 4:1 | Good | 60 |
| | 10 | H | 700 | 10 | EC + MEC | 1:1 | Good | 264 |
| | 11 | H | 800 | 5 | EC + PC + MEC | 2:2:1 | Good | 70 |
| | 12 | H | 800 | 5 | EC + PC + MEC | 5:4:1 | Good | 90 |
| | 13 | H | 800 | 5 | EC + MEC | 2:1 | Good | 58 |
| | 14 | H | 800 | 5 | EC + MEC | 1:1 | Good | 42 |
| | 15 | H | 800 | 5 | EC + DMC | 1:1 | Good | 38 |
| | 16 | H | 800 | 5 | EC + DEC | 1:1 | Good | 38 |
| | 17 | H | 800 | 5 | PC + DMC | 1:1 | Good | 33 |
| | 18 | H | 800 | 5 | EC + MEC | 1:2 | Good | 29 |
| | 19 | H | 800 | 7 | EC + MEC | 1:2 | Good | 151 |
| | 20 | H | 800 | 10 | EC + MEC | 1:2 | Good | 810 |
| | 21 | H | 800 | 15 | EC + MEC | 1:2 | Good | *3 |
| | 22 | H | 1300 | 5 | EC + MEC | 2:1 | Good | 192 |
| | 23 | H | 1300 | 5 | EC + MEC | 1:1 | Good | 131 |
| | 24 | H | 1300 | 5 | EC + MEC | 1:2 | Good | 104 |
| Ref. ex. 1 | 1 | H | 700 | 5 | EC + MEC | 1:4 | Not bad *1 | Unmesurable |
| | 2 | H | 700 | 5 | EC + MEC | 5:1 | Not bad *2 | |
| | 3 | H | 800 | 20 | EC + MEC | 1:2 | Not bad *1 | |
| | 4 | H | 1300 | 5 | EC + MEC | 1:4 | Not bad *1 | |
| | 5 | P | 800 | 5 | EC + MEC | 1:1 | Not bad *1 | |
| | 6 | A | 800 | 5 | EC + MEC | 1:1 | Not bad *1 | |
| | 7 | B | 800 | 5 | EC + MEC | 1:1 | Not bad *1 | |

*1 Not completely solved and some insoluble matters remain.
*2 Solved once, but deposition of polyvinyl formal resin found when cooled down to a room temperature.
*3 No measurement performed.

Table 1 shows that the solubility is largely enhanced in a mixed solvent of the cyclic carbonate ester and the chain carbonate ester. Further, it shows that the polyvinyl formal resin is excellent in solubility among the polyvinyl acetal resin.

Test Example 2

Measurement of Ignition Point of Varnish

The polyvinyl formal resin (of which mean degree of polymerization is 800) obtained in the synthesis example 1 was dissolved in various types of nonaqueous solvent, thus preparing polyvinyl formal resin varnish having 5 wt % concentration. The ignition point of the varnish was measured by the tag closed cup method, and the result is shown in Table 2.

TABLE 2

| No. | | Nonaqueous solvent | Ignition point (° C.) |
|---|---|---|---|
| Ex. 2 | 1 | EC + DMC (1:1 V/V) | 25 |
| | 2 | EC + EMC (1:1 V/V) | 32 |
| | 3 | EC + DEC (1:1 V/V) | 40 |
| Comp. ex. 1 | 1 | EC + ethylacetate (1:1 V/V) | 3 |
| | 2 | Toluene + ethanol (1:1 V/V) | 11 |

Table 2 shows that the varnish of the invention is low in inflammability, thus very low in risk of causing a fire, resulting in high safety.

Test Example 3

Gelation Test of Nonaqueous Electrolyte Solution

The varnish made of polyvinyl formal resin obtained in the synthesis example 1 or the varnish made of polyvinyl formal resin obtained in the synthesis example 2 were mixed into a solvent of nonaqueous electrolyte solution into which a dehydration agent was further-mixed, thus preparing a nonaqueous electrolyte solution.

The varnish was mixed into the nonaqueous solvent so that a concentration of the polyvinyl formal resin or an acid-denatured material thereof was 10%, with the result that the following A to C varnish was obtained.

The varnish A (the invention) was obtained by dissolving the polyvinyl formal resin of the synthetic example 1 in a mixed solvent which is composed of EC and MEC at 1:1 (volume ratio). The varnish B (the invention) was obtained by dissolving the acid-denatured material of polyvinyl formal resin of the synthesis example 2 in a mixed solvent which is composed of EC and EMC at 1:1 (volume ratio). The varnish C (for comparison) was obtained by dissolving the polyvinyl formal resin of the synthesis example 1 in a mixed solvent of toluene and butanol at 1:1 (volume ratio).

As the solvent of nonaqueous electrolyte solution, two types of solvents were used, one of which was for electric double layer capacitor (hereinafter referred to as "for capacitor") and the other of which was for lithium battery (hereinafter referred to as "for lithium battery").

As the solvent of nonaqueous electrolyte solution for capacitor, propylene carbonate was used which contained tetrabutylammonium tetrafluoroborate at a ratio of 1 mol/liter. As the solvent of nonaqueous electrolyte solution for lithium battery, a mixed solvent composed of EC and EMC (1:1 volume ratio) was used which contained lithium hexafluorophosphate at a ratio of 1 mol/liter. Both of the two types of solvents of nonaqueous electrolyte solutions were adjusted so that water contents contained therein were respectively 10 ppm or less.

The solvent of nonaqueous electrolyte solution and the varnish were mixed with each other at 4:1 (weight ratio) and then 0.5 wt % dehydration agent was added and left to observe a gelling state every 15 minutes. As the dehydration agent, tributyl borate or tris(trimethylsilyl) phosphate were used. The result is shown in Table 3.

TABLE 3

|  | Solvent for nonaqueous electrolyte solution | Varnish Type | Water content ppm | Dehydration agent | Gelling time (min.) |
|---|---|---|---|---|---|
| Ex. 3 | For capacitor | A | 50 | Tributyl borate | 30 min. |
| Ex. 4 | For lithium battery | A | 200 | Tributyl borate | 60 min. |
| Ex. 5 | For lithium battery | A | 50 | Tributyl borate | 30 min. |
| Ex. 6 | For lithium battery | B | 50 | Tributyl borate | 15 min. |
| Ex. 7 | For lithium battery | A | 20 | Tributyl borate | 15 min. |
| Ex. 8 | For lithium battery | A | 20 | tris(trimethylsilyl) phosphate | 15 min. |
| Ref. ex. 2 | For lithium battery | A | 1000 | Tributyl borate | No gelation even after 120 min. |
| Comp. ex. 2 | For lithium battery | C | 20 | tris(trimethylsilyl) phosphate |  |

Table 3 showed that the varnish of the invention exhibited an effect of gelling the solvent of nonaqueous electrolyte solution when used in combination with the dehydration agent, thus being effective for preventing the electric double layer capacitor and the lithium battery from having a leaking liquid. Further, it showed that in order to exert the effect, the water content of the varnish was desirably set to be small.

Synthesis Example 3

A solution containing an acid-denatured material of polyvinyl formal resin was obtained in the same manner as the synthesis example 2 except for the use of polyvinyl formal resin which is different in content ratio of the vinyl formal unit ($R_1$=hydrogen atom in the general formula (1)), the vinyl alcohol unit (2), and the vinyl acetate unit (3) ($R_2$=methyl group in the general formula (3)). A thus-obtained acid-denatured material had properties shown in Table 4. Further, regarding all of the obtained three types of acid-denatured materials except for polyvinyl formal containing 2.8 mol/kg hydroxyl group, the concentrations of protons appearing at 4.28 ppm were 70% or less-decreased by the acid treatment.

Example 9 and Reference Example 3

A nonaqueous electrolyte solution was obtained by mixing the varnish containing the acid-denatured material of polyvinyl formal resin; ethylene carbonate; and ethyl methyl carbonate, which were obtained in the synthesis example 2 and the synthesis example 3. The nonaqueous electrolyte solution was prepared so that a weight ratio of ethylene carbonate and ethyl methyl carbonate was 2:3, that a concentration of $LiPF_6$ was 1 mol/liter, and that the acid-denatured material of polyvinyl formal resin had a concentration (c, %) shown in Table 4. The nonaqueous electrolyte solutions of the invention were denoted by T1 to T10 (Example 9) while R1 to R4 denote nonaqueous electrolyte solutions of Reference example.

Note that acid-denatured materials of the nonaqueous electrolyte solutions T1 to T6 and R1 to R2 are obtained in the synthesis example 2 while the acid-denatured materials of T7 to T10 and R3 to R4 are obtained in the synthesis example 3.

TABLE 4

| | | Acid-denatured material of polyvinyl formal resin | | | | | | |
|---|---|---|---|---|---|---|---|---|
| | Electrolyte solution | Resin composition (%) | | | Number average molecular weight λ | Content of hydroxyl group mol/kg | Concentration c % | $\lambda^{1/2} \times c$ |
| | | (1) | (2) | (3) | | | | |
| Ex. 9 | T1 | 82.5 | 5.9 | 11.6 | $7.1 \times 10^4$ | 1.3 | 0.5 | 133 |
| | T2 | 82.5 | 5.9 | 11.6 | $7.1 \times 10^4$ | 1.3 | 1 | 266 |
| | T3 | 82.5 | 5.9 | 11.6 | $7.1 \times 10^4$ | 1.3 | 1.5 | 400 |
| | T4 | 80.3 | 3.2 | 16.4 | $7.1 \times 10^4$ | 0.73 | 1.5 | 400 |
| | T5 | 82.5 | 5.9 | 11.6 | $7.1 \times 10^4$ | 1.3 | 2 | 533 |
| | T6 | 82.5 | 5.9 | 11.6 | $7.1 \times 10^4$ | 1.3 | 3 | 800 |
| | T7 | 82.5 | 6.3 | 11.2 | $11.6 \times 10^4$ | 1.4 | 1.5 | 511 |
| | T8 | 81.2 | 7.6 | 11.2 | $20.4 \times 10^4$ | 1.7 | 0.8 | 361 |
| | T9 | 81.2 | 7.6 | 11.2 | $20.4 \times 10^4$ | 1.7 | 1.5 | 677 |
| | T10 | 81.2 | 7.6 | 11.2 | $20.4 \times 10^4$ | 1.7 | 2.0 | 903 |
| Ref. Ex. 3 | R1 | 82.5 | 5.9 | 11.6 | $7.1 \times 10^4$ | 1.3 | 4 | 1070 |
| | R2 | 82.5 | 5.9 | 11.6 | $7.1 \times 10^4$ | 1.3 | 5 | 1330 |
| | R3 | 81.2 | 7.6 | 11.2 | $20.4 \times 10^4$ | 1.7 | 2.5 | 1130 |
| | R4 | 87.5 | 12.3 | 0.3 | $7.1 \times 10^4$ | 2.8 | 1.5 | *4 |

*4 Uncalculatable due to too many insoluble matters

Among the nonaqueous electrolyte solutions shown in Table 4, R4 had a large amount of acid-denatured material not evenly dissolved and thus remained in the nonaqueous solvent. This shows that the polyvinyl formal resin having a content of hydroxyl group exceeding 2 mol/liter is not appropriate as an additive to the nonaqueous electrolyte solution. The other nonaqueous electrolyte solution had the acid-denatured material dissolved in the nonaqueous solvent.

Test Example 4

A nonaqueous electrolyte solution was prepared using polyvinyl acetal resin, polyvinyl propyral resin, or polyvinyl butyral resin, instead of the polyvinyl formal resin, with the same composition as that of the nonaqueous electrolyte solution T3. The solubility of each resin into the nonaqueous solvent and the stability of the nonaqueous electrolyte solution stored at 25° C. were visually observed. The result is shown in Table 6.

TABLE 5

| Nonaqueous electrolyte solution | Solubility of resin | Preservation Stability of nonaqueous electrolyte solution |
| --- | --- | --- |
| T3 | Evenly soluble | Liquid state kept for more than thirty days |
| Containing polyvinyl acetal resin | Some insoluble matters found | Liquid state kept for three days |
| Containing polyvinyl propyral resin | Some insoluble matters found | Liquid state kept for seven days |
| Containing polyvinyl butyral resin | Some insoluble matters found | Liquid state kept for seven days |

Table 5 shows that the nonaqueous electrolyte solution (T3) using polyvinyl formal resin can be evenly dissolved in the electrolyte solution and even after stored for thirty days or longer, remained in a liquid state without insoluble matters and depositions, thus being most suitably used for the nonaqueous electrolyte solution of the invention. It is obvious that the other nonaqueous electrolyte solution using polyvinyl acetal resin may require a treatment of removing insoluble matters and furthermore, it is good to inject the nonaqueous electrolyte solution into the electrochemical device shortly after the nonaqueous electrolyte solution is prepared, without being stored for a long period of time.

Example 10-19 and Reference Example 4-8

1) Fabrication of Negative Electrode

Negative electrode mix slurry was prepared by mixing 74 parts of mesocarbon microbeads (trade name: MCMB10-28 manufactured by Osaka Gas Co., Ltd.); 20 parts of natural graphite (trade name: LF18A manufactured by Chuetsu Graphite Works Co., Ltd.); and 6 parts of polyvinylidene fluoride (PVDF, binder) with each other and dispersing the mixture in 100 parts of N-methylpyrrolidinone. The negative electrode mix slurry was applied to a 18 μm-thick negative electrode current collector made of a belt-like copper foil, followed by drying. This was then pressed under pressure of about $29.42 \times 10^6$ Pa (300 kg/cm$^2$), thereby fabricating the negative electrode. A negative electrode active material in the negative electrode had a porosity of 0.3.

2) Fabrication of Positive Electrode

LiCoO$_2$ mix slurry was prepared by mixing 82 parts of LiCoO$_2$ (trade name: HLC-22 manufactured by Honjo FMC Energy Systems Co., Ltd.); 7 parts of graphite (conductive agent); 3 parts of acetylene black (conductive agent); and 8 parts of polyvinylidene fluoride (PVDF, binder), and dispersing the mixture in 80 parts of N-methylpyrrolidone. The LiCoO$_2$ mix slurry was applied to a 20 μm-thick aluminum foil (positive electrode current collector), followed by drying. This was then pressed under pressure of about $9.8 \times 10^7$ Pa (1000 kg/cm$^2$), thereby fabricating the positive electrode. A positive electrode active material in the positive electrode had a porosity of 0.25.

3) Fabrication of Coin-shaped Battery

The negative electrode obtained as above (1) was punched out into a shape of 14 mm-diameter circle, and used as a negative electrode. The negative electrode contained the negative electrode mix which was 80 μm in thickness and 20 mg/14 mmø in weight.

The positive electrode obtained as above (2) was punched out into a shape of 13.5 mm-diameter circle, and used as a positive electrode. The LiCoO$_2$ electrode contained the LiCoO$_2$ mix which was 70 μm in thickness and 42 mg/13.5 mmø in weight.

The negative electrode (14 mm in diameter) was disposed on a surface of a negative electrode can inside a 2032-sized stainless steel-made battery can so that the negative electrode current-collector came into contact with the surface of negative electrode can. On the negative electrode were furthermore laminated a separator (25 μm in thickness and 16 mm in diameter) made of microporous polypropylene film and a positive electrode (13.5 mm in diameter) sequentially. And then, between the separator and the negative electrode and between the separator and the positive electrode were injected 0.25 ml of ten types of the nonaqueous electrolyte solutions (T1-T10) of the invention or four types of the nonaqueous electrolyte solutions (R1-R4) of Reference example 3, where an aluminum plate (1.2 mm in thickness and 16 mm in diameter) and a spring were housed. Finally, a lid of battery can was attached via a gasket made of polypropylene, thereby keeping airtightness of the battery. A coin-shaped lithium-ion secondary battery was thus fabricated which was 20 mm in diameter and 3.2 mm in height.

4) Fabrication of Cylindrical Secondary Battery

First of all, a negative electrode was fabricated as follows. A negative electrode mix was prepared by mixing 70 parts of mesocarbon microbeads (trade name: MCMB10-28 manufactured by Osaka Gas Co., Ltd.); 20 parts of natural graphite (trade name: LF18A manufactured by Chuetsu Graphite Works Co., Ltd.); and as a binder, 10 parts of polyvinylidene fluoride. Furthermore, the negative electrode mix was then dispersed in N-methyl-2-pyrrolidone to be thereby formed into slurry. And then, the slurry was applied evenly to both sides of a 10 μm-thick belt-like copper foil serving as a negative electrode current collector, followed by drying, and then shaped through compression by a roll press machine, thereby fabricating the negative electrode.

Next, a positive electrode was fabricated as follows. A positive electrode mix was prepared by mixing 91 parts of LiCoO$_2$ (trade name: HLC-22 manufactured by Honjo FMC Energy Systems Co., Ltd.); as a conductive agent, 6 parts of graphite; and as a binder, 3 parts of polyvinylidene fluoride.

Furthermore, the positive electrode mix was then dispersed in N-methyl-2-pyrrolidone to be thereby formed into slurry. And then, the slurry was applied evenly to both sides of a 20 μm-thick aluminum foil serving as a positive electrode current collector, followed by drying, and then shaped through compression by a roll press machine, thereby fabricating the positive electrode.

Next, the negative electrode and the positive electrode were sequentially laminated via a 20 μm-thick separator made of a microporous polypropylene film, which were spirally wound plural times, thereby fabricating a wound body. The wound body was housed in an iron-made battery can plated with nickel after inserting an insulating plate onto a bottom part of the can. Subsequently, in order to collect electricity from the negative electrode, one end of nickel-made negative electrode lead was adhered to the negative electrode by pressure, and the other end was welded to the battery can. Further, in order to collect electricity from the positive electrode, one end of aluminum-made positive electrode lead was attached to the positive electrode by pressure, and the other end was electrically connected to the battery lid via a thin current-cutoff sheet for interrupting the current according to an inner pressure of the battery.

Next, 4 ml of each of the five types of nonaqueous electrolyte solutions (T1, T2, T3, T5, T6) of the invention in Example 9 and the two types of nonaqueous electrolyte solutions (R1, R2) in Reference example 3 was injected into the above-stated battery can while repeating an operation of reducing the pressure inside the battery can and returning the reduced pressure to the normal pressure, thus injecting the electrolyte solution into the battery can. Finally, the battery can was fastened via an insulation sealing gasket coated with asphalt so that the battery lid was fixed, thus fabricating a cylindrical nonaqueous electrolyte solution battery which is 18 mm in diameter and 65 mm in height.

5) Cross-link Through Charging

The coin-shaped lithium-ion secondary battery of Examples 10 to 19 obtained as above 3) was charged with a current of 2 mA, and the cylindrical lithium-ion secondary battery of Example 11 to 20 obtained as above 4) was charged with 0.2 A, until the voltage reached 4.2 V so that the acid-denatured material of the polyvinyl formal resin contained in the nonaqueous electrolyte solution was cross-linked, thereby manufacturing the coin-shaped and cylindrical lithium-ion secondary battery of the invention.

Test Example 5

A coin-shaped lithium secondary battery was fabricated using the nonaqueous electrolyte solution T5 of Example 9. This was left at a room temperature (25° C.) or 50° C. for 24 hours after charged with a current of 2 mA until the voltage reached 0.5 V, 3.8 V, or 4.0 V. This stage left for 24 hours corresponds to an aging process in a method of manufacturing a generally-used electrochemical device. And then, the coin-shaped lithium secondary battery was disassembled to evaluate adhesiveness between the electrode and the separator. The result is shown in Table 6.

Further, also evaluated in the same way was adhesiveness between the electrode and the separator of a coin-shaped lithium secondary battery which was left at a room temperature (25° C.) or 50° C. for 24 hours without being charged. The result was shown in Table 6.

TABLE 6

| No. | Charging voltage | Temperature when left | Adhered or not adhered |
| --- | --- | --- | --- |
| 1 | No charging | 25° C. | Not adhered |
| 2 | No charging | 50° C. | Not adhered |
| 3 | 0.5 V | 25° C. | Not adhered |
| 4 | 0.5 V | 50° C. | Not adhered |
| 5 | 3.8 V | 25° C. | Adhered |
| 6 | 3.8 V | 50° C. | Strongly adhered |
| 7 | 4.0 V | 25° C. | Strongly adhered |
| 8 | 4.0 V | 50° C. | Strongly adhered |

As seen in Table 6, it is obvious that the charging to 3.8 V or 4.0 V causes the cross-link of the acid-denatured material of the polyvinyl acetal resin contained in the nonaqueous electrolyte solution T5, whereby the electrode (negative electrode and positive electrode) and the separator are adhered to each other. Furthermore, it is also obvious that in the case of performing aging after charging to 3.8 to 4.0 V, the adhesive strength is further enhanced. It can be also found that in contrast, the charging to 0.5 V or no charging will cause no cross-linking of the acid-denatured material even through warming at the aging step, resulting in no adhesion between the electrode and the separator.

Note that a difference in instrumental analysis between the acid-denatured material of the polyvinyl formal resin and a cross-linked material of the acid-denatured material will presumably become apparent in $^{13}$C-solid NMR spectrum of both of the materials. To be specific, the measurement was conducted as follows. The battery was disassembled to collect a gelled material existing inside the separator or in an interface between the separator and the electrode. The gelled material was put in a commercially-available sealed cell made of Teflon (registered trademark), and the sealed cell was inserted into a 7.5 mm-sample tube. The sample tube was spun at 2000 Hz for $^{13}$C-solid NMR measurement. As the measurement device, a CMX300 7.5 mm-probe manufactured by Chemagnetics Inc. was used. As condition for the measurement, a single pulse method was performed at a resonant frequency 75.5578 MHz while a pulse was 30° pulse with 1.7 μs and a band width was set at 30 kHz.

Signals observed in the $^{13}$C-solid NMR spectrum of the cross-linked material measured by the above method are smaller in number around 70 ppm than that of the acid-denatured material, and signals observed around 90 to 110 ppm in the $^{13}$C-solid NMR spectrum of the cross-linked material measured by the above method are not found in that of the acid-denatured material. The signals around 70 ppm are presumed as signals representing carbons to each of which a hydroxyl group is bonded, and the signals around 90 to 110 ppm are presumed as signals representing carbons each of which is bonded to two oxygens of an acetal ring. Accordingly, a decrease of signals around 70 ppm and observation of signals which are not found in an original acid-denatured material, presumably indicate that the hydroxyl group in the acid-denatured material of polyvinyl formal resin reacts with an aldehyde group produced on a polymer chain end to thereby form a new acetal ring so that a polymer chain is cross-linked.

Test Example 6

Cylindrical and coin-shaped lithium-ion secondary batteries were fabricated respectively using electrolyte solutions T1 to T3, T5, T6, R1 and R2. An infusion capacity (g) of nonaqueous electrolyte solution to the cylindrical battery was measured.

Further, impedance of the coin-shaped and cylindrical batteries were measured at 10 kHz and according to the following formula, and a rate of impedance change was obtained. The result was shown in Table 7.

Rate of impedance change=$X/Y$ wherein X represents impedance of respective batteries, and Y represents impedance of a battery to which the nonaqueous electrolyte solution of Example 10 was infused.

TABLE 7

|  |  | Electrolyte solution No. | $\lambda^{1/2} \times c$ | c weight % | Infusion capacity g | Rate of impedance change Cylindrical battery | Rate of impedance change Coin battery |
|---|---|---|---|---|---|---|---|
| Ex. | 9 | T1 | 133 | 0.5 | 4.7 | 1.0 | 1.0 |
|  | 10 | T2 | 266 | 1 | 4.7 | 1.0 | 1.0 |
|  | 11 | T3 | 400 | 1.5 | 4.7 | 1.0 | 1.0 |
|  | 13 | T5 | 533 | 2 | 4.5 | 1.2 | 1.0 |
|  | 14 | T6 | 800 | 3 | 4.1 | 1.7 | 1.0 |
| Ref. | 4 | R1 | 1070 | 4 | 3.0 | 3.7 | 1.1 |
| Ex. | 5 | R2 | 1330 | 5 | 2.3 | 4.7 | 1.3 |

Table 7 shows that an infusing property of nonaqueous electrolyte solution to a battery is hardly decreased in the implantation example while an infusing amount of nonaqueous electrolyte solution is decreased in Reference example.

Further, Table 8 shows that the rate of impedance change at 10 kHz was close to zero in Examples while the rate of impedance change at 10 kHz was largely increased in Reference examples. The impedance at 10 kHz corresponds to electric resistance derived from the nonaqueous electrolyte solution in the battery. A large value of the impedance indicates that the infusion of the nonaqueous electrolyte solution to the battery is insufficient or that permeation of the electrolyte solution into pores in the active material or between the active materials is insufficient. Accordingly, the nonaqueous electrolyte solution exhibiting 1000 or more of $\lambda^{1/2} \times c$ was poor in infusing property of nonaqueous electrolyte solution and especially, the cylindrical battery highly-filled with an electrode active material or the like was notably low in infusing property.

Test Example 7

Coin-shaped lithium-ion secondary batteries were fabricated respectively using the electrode solutions T1 to T10 and R1 to R4. These were charged to 4.2 V and discharged to 3.0 V with a current of 0.5 mA. A charging capacity at this time was referred to as "initial charging capacity". The battery was charged to 4.0 V and left for 24 hours. The battery was evaluated in terms of adhesiveness, initial charging/discharging property, and battery property after stored at a high temperature, which will be explained hereinbelow. The result is shown in Table 8.

[Evaluation of Adhesiveness]

These batteries were disassembled, thereby peeling off the electrode and the separator to check adhesiveness therebetween which was then evaluated according to the following criteria.

Very Good: The active material layer of electrode and the separator were so tightly adhered to each other that even the peeling operation caused the electrode to be peeled off from the interface between the current collector and the active material layer, thus leaving the separator attached to the active material layer of the electrode.

Good: The active material layer of electrode and the separator were sufficiently adhered to each other, but the peeling operation caused the electrode to be peeled off from the interface between its active material layer and the separator.

Poor: The active material layer of electrode and the separator were adhered to each other, but the peeling operation caused the electrode to be easily peeled off from the interface between its active material layer and the separator.

[Evaluation of Initial Charging/discharging Characteristics]

The battery was charged and then discharged to 3.0 V with a current of 10 mA to thus obtain "a discharging capacity at 10 mA". Subsequently, the battery was charged to 4.2 V and then discharged to 3.0 V with a current of 5 mA to thus obtain "a discharging capacity at 5 mA". A percentage of "the discharging capacity at 10 mA" relative to "the initial discharging capacity" was defined as "a high load indicator" while a percentage of "the discharging capacity at 5 mA" relative to "the initial discharging capacity" was defined as "a middle load indicator", which were then compared to each other for evaluation.

[Evaluation of Battery Characteristics after High-temperature Storage]

These batteries were charged to 4.2 V and then stored at 85° C. for three days, and "the high load indicator" and "the middle load indicator" were obtained again.

TABLE 8

|  |  | Electrolyte solution No. | Additive amount c Weight % | Weight-average molecular weight $\lambda$ | $\lambda^{1/2} \times c$ | Content of OH group mol/kg | Adhesiveness | Initial Load Middle | Initial Load High | After high-temperature storage Load Middle | After high-temperature storage Load High |
|---|---|---|---|---|---|---|---|---|---|---|---|
| Example | 10 | T1 | 0.5 | $7.1 \times 10^4$ | 133 | 1.3 | Poor | 93 | 60 | 68 | 22 |
|  | 11 | T2 | 1 | $7.1 \times 10^4$ | 266 | 1.3 | Good | 93 | 58 | 68 | 21 |

TABLE 8-continued

|  | Electrolyte solution No. | Additive amount c Weight % | Weight-average molecular weight λ | $\lambda^{1/2} \times c$ | Content of OH group mol/kg | Adhesiveness | Initial Load Middle | Initial Load High | After high-temperature storage Load Middle | After high-temperature storage Load High |
|---|---|---|---|---|---|---|---|---|---|---|
| 12 | T3 | 1.5 | $7.1 \times 10^4$ | 400 | 1.3 | Good | 93 | 53 | 68 | 21 |
| 13 | T4 | 2 | $7.1 \times 10^4$ | 533 | 1.3 | Very Good | 92 | 48 | 67 | 21 |
| 14 | T5 | 3 | $7.1 \times 10^4$ | 800 | 1.3 | Very good | 90 | 44 | 67 | 15 |
| 15 | T6 | 1.5 | $7.1 \times 10^4$ | 400 | 0.74 | Poor | 94 | 58 | 68 | 21 |
| 16 | T7 | 1.5 | $11.6 \times 10^4$ | 511 | 1.4 | Very good | 94 | 57 | 68 | 24 |
| 17 | T8 | 0.8 | $20.4 \times 10^4$ | 361 | 1.7 | Good | 94 | 62 | 69 | 26 |
| 18 | T9 | 1.5 | $20.4 \times 10^4$ | 677 | 1.7 | Very good | 94 | 59 | 68 | 24 |
| 19 | T10 | 2.0 | $20.4 \times 10^4$ | 903 | 1.7 | Very good | 92 | 46 | 67 | 21 |
| Ref. ex. 4 | R1 | 4 | $7.1 \times 10^4$ | 1070 | 1.3 | Very good | 62 | 20 | 39 | 7 |
| 5 | R2 | 5 | $7.1 \times 10^4$ | 1330 | 1.3 | Very good | 42 | 15 | 11 | 3 |
| 6 | R3 | 2.5 | $20.4 \times 10^4$ | 1130 | 1.7 | Very good | 75 | 31 | 58 | 15 |
| 7 | R4 | 1.5 | $7.1 \times 10^4$ | *5 | 2.79 | Poor | 77 | 35 | 60 | 15 |

In view of the foregoing, the batteries of Examples 10 to 19 using the nonaqueous electrolyte solutions which exhibit 100 to 1000 of $\lambda^{1/2} \times c$, each have the electrode and the separator adhered to each other and are excellent in the battery characteristics.

In contrast, the batteries of Reference examples 4 to 6 using the electrolyte solutions which exhibit 1000 or more of $\lambda^{1/2} \times c$, each have the electrode and the separator adhered to each other, but are low in battery characteristics. In Reference example 7, the electrode and the separator are adhered to each other, but the battery characteristics is low, using the electrolyte solution which exhibits even 100 to 1000 of $\lambda^{1/2} \times c$, but 2.0 mol/kg or more of the concentration of the hydroxyl group in the acid-denatured material of the polyvinyl formal resin.

Examples 20-29 and Comparative Example 3

1) Preparation of Nonaqueous Electrolyte Solution

Examples 21-30

First, EC and MEC were mixed at 2:3 (weight ratio) and in a thus-obtained mixed solvent, LiPF$_6$ (electrolyte) and vinylene carbonate were dissolved. To a thus-obtained electrolyte solution was added varnish which had been obtained by dissolving the polyvinyl formal resin in a mixed solvent composed of EC:MEC=2:3 (weight ratio), and the varnish was then dissolved in the electrolyte solution to which tris(trimethylsilyl) phosphate was subsequently added, thus preparing the nonaqueous electrolyte solution of the invention. The result is shown in Table 9.

A content of LiPF$_6$ is 1 mol/liter, and a content of vinylene carbonate is 1%. The content of polyvinyl formal resin and the content of tris(trimethylsilyl) phosphate are stated in Table 10. Note that the nonaqueous electrolyte solution contained 0.01% fluorinated acid which had been produced by reacting LiPF$_6$ of electrolyte with water.

Tris(trimethylsilyl) phosphate is used as a compound for producing trimethylsilyl fluoride in the nonaqueous electrolyte solution, and trimethylsilyl fluoride is Lewis acid of which acid-producing rate is high.

TABLE 9

| Example | Polyvinyl formal resin Mean degree of polymerization | Polyvinyl formal resin Content (%) | Content of tris(trimethylsilyl) phosphate (%) |
|---|---|---|---|
| 20 | 800 | 2 | — |
| 21 | 800 | 2 | 0.1 |
| 22 | 800 | 2 | 0.5 |
| 23 | 800 | 2 | 0.25 |
| 24 | 800 | 1.5 | 0.25 |
| 25 | 800 | 2.5 | 0.25 |
| 26 | 1300 | 2 | 0.25 |
| 27 | 500 | 2 | 0.25 |
| 28 | 500 | 1.5 | 0.25 |
| 29 | 100 | 2.5 | 0.25 |

2) Preparation of Nonaqueous Electrolyte Solution

Comparative Example 3

First, EC and MEC were mixed at a ratio of 2:3 (weight ratio), and to a thus-obtained mixed solvent were sequentially added LiPF$_6$ (electrolyte), vinylene carbonate, trimethylolpropane ethoxylate acrylate (EO/OH=14/3 manufactured by Aldrich Corp.) and a radical polymeric initiator (trade name: Perbutyl® PV manufactured by NOF Corporation), which were then dissolved in the mixed solvent, thus preparing the nonaqueous electrolyte solution of Comparative example.

A content of LiPF$_6$ and vinylene carbonate is 1 mol/liter, and a content of vinylene carbonate is 1%. A content of trimethylolpropane ethoxylate acrylate is 5%. There was added 3000 ppm of the radical polymeric initiator. In this case, trimethylolpropane ethoxylate acrylate is a macromonomer for gel-typed polyelectrolyte. The radical polymeric initiator is an additive for gelation of the macromonomer.

3) Fabrication of Negative Electrode

A negative electrode was fabricated in the same manner as the above (Examples 10-20 and Reference examples 4-8).

4) Fabrication of Positive Electrode

A positive electrode was fabricated in the same manner as the above (Examples 10-20 and Reference examples 4-8).

<Fabrication of Coin-shaped Battery>

The above negative electrode was punched out into a 14 mm-diameter disc shape, and used as a negative electrode. The coin-shaped negative electrode contained the negative electrode mix which was 80 µm in thickness and 20 mg/14 mmø in weight.

The above positive electrode was punched out into a 13.5 mm-diameter disc shape, and used as a positive electrode. The LiCoO$_2$ electrode contained the LiCoO$_2$ mix which was 70 µm in thickness and 42 mg/13.5 mmø in weight.

Inside a 2032-sized stainless steel-made battery were laminated in this order the 14 mm-diameter negative electrode, the 16 mm-diameter and 25 µm-thick microporous polypropylene film-made separator, and the 13.5 mm-diameter positive electrode. And then, 0.04 ml of the nonaqueous electrolyte solution obtained as above was injected to the separator so that an aluminum plate (1.2 mm in thickness and 16 mm in diameter) and a spring were housed. Finally, a lid of battery can was fastened via a gasket made of polypropylene, thereby keeping airtightness of the battery. Coin-shaped lithium batteries of Examples 20 to 29 and Comparative example 3 were thus fabricated, each of which was 20 mm in diameter and 3.2 mm in height. Note that gelation of the nonaqueous electrolyte solution was caused by furthermore heating the coin-shaped lithium battery of Comparative example 3 at 60° C. for five hours, and thereby the gel-typed polyelectrolyte was produced.

Example 31

1) Fabrication of Negative Electrode

A negative electrode was fabricated in the same manner as Example 20. A surface of negative electrode active material layer of negative electrode was coated with 4% propylene carbonate solution of polyvinyl formal resin at a ratio of 5 mg per square centimeter (15 mg per gram of graphite) and then dried, thus forming a polyvinyl formal film.

2) Fabrication of Positive Electrode

A positive electrode was fabricated in the same manner as Example 20. A surface of positive electrode active material layer of positive electrode was coated with 4% propylene carbonate solution of polyvinyl formal resin at a ratio of 5 mg per square centimeter (15 mg per gram of graphite) and then dried, thus forming a polyvinyl formal film.

3) Fabrication of Separator

A surface of a microporous polypropylene film, i.e., separator was coated with 2% propylene carbonate solution of polyvinyl formal resin at a ratio of 2 mg per square centimeter cm$^2$ and then dried, thus forming a polyvinyl formal film.

4) Fabrication of Coin-shaped Battery

The above negative electrode coated with the polyvinyl formal film was punched out into a 14 mm-diameter disc shape, and used as a negative electrode. The coin-shaped negative electrode contained the negative electrode mix which was 80 µm in thickness and about 20 mg/14 mmø in weight.

The above positive electrode coated with the polyvinyl formal film was punched out into a 13.5 mm-diameter disc shape, and used as a positive electrode. The LiCoO$_2$ electrode contained the LiCoO$_2$ mix which was 70 µm in thickness and about 42 mg/13.5 mmø in weight.

The above about-25 µm-thick microporous polypropylene film coated with the polyvinyl formal film was punched out to a 16 mm-diameter shape, and used as a separator.

Inside a 2032-sized stainless steel-made battery were laminated in this order the 14 mm-diameter negative electrode, the 16 mm-diameter and 25 µm-thick microporous polypropylene film-made separator, and the 13.5 mm-diameter positive electrode. And then, 0.04 ml of the nonaqueous electrolyte solution was injected to the separator so that an aluminum plate (1.2 mm in thickness and 16 mm in diameter) and a spring were housed. Finally, a lid of battery can was fastened via a gasket made of polypropylene, thereby keeping airtightness of the battery. This was left at a room temperature for 12 hours, thus fabricating the coin-shaped lithium battery of Example 30.

Note that the nonaqueous electrolyte solution was obtained by mixing EC and MEC at a ratio of 2:3 (weight ratio) and adding to this mixed solvent LiPF$_6$ (electrolyte) at 1 mol/liter and 1% vinylene carbonate, which were then dissolved in the mixed solvent.

Comparative Example 4

The nonaqueous electrolyte solution used in Example 30 was used as a nonaqueous electrolyte solution to thereby fabricate a coin-shaped lithium battery for comparison in the same manner as Example 20 by use of the negative electrode, positive electrode, and separator as Example 20.

Test Example 8

Viscosity Measurement of Nonaqueous Electrolyte Solution

By using an E-type viscometer (manufactured by Tohki Sangyo Co.), viscosity of the nonaqueous electrolyte solution of each of Examples 20 to 29 and Comparative example 4 at 25° C. was measured.

<Evaluation of Battery Characteristics>

The coin-shaped lithium batteries of Examples 20 to 29 and Comparative examples 3 to 4 were firstly charged to 4.2 V with a current of 0.5 mA, and then discharged with a constant current of 5 mA until the voltage of the battery reached 3 V (initial charging). The discharging capacity at this time was defined as "an initial capacity". Further, a ratio of the initial capacity relative to the charging capacity was defined as "an initial charging/discharging efficiency (%)". Next, the battery was charged to 4.2 V and then discharged with a constant current of 5 mA until the voltage of the battery reached 3 V. The discharging capacity at this time was defined as "5 mA discharging capacity". Further, a ratio of the 5 mA discharging capacity relative to the initial capacity was defined as "5 mA discharging capacity ratio (%)". The measurement was conducted at 25° C. Next, after the battery was charged to 4.1 V and then stored at 60° C. for two days (which is referred to as aging storage), the battery characteristic (5 mA discharging capacity) was measured to obtain the 5 mA discharging capacity ratio (%). Subsequently, after the battery was charged to 4.2 V and then stored at 85° C. for three days (which is referred to as high-temperature storage), the battery characteristic (5 mA discharging capacity) was measured to obtain the 5 mA discharging capacity ratio (%). The storage characteristic was evaluated by comparison with the battery characteristic obtained after the initial charging. Note that through the above initial charging and aging storage, acid is sufficiently produced in the battery, and the polyvinyl formal resin dissolved or swelled in the nonaqueous electrolyte solution is acid-denatured and furthermore cross-linked, followed by being separated from the nonaqueous electrolyte solution, with the result that the electrode and the separator are tightly adhered to each other.

<Checking Adhesiveness Between Electrode and Separator>

The battery was disassembled after the aging storage and high-temperature storage test, thereby peeling off the electrode and the separator to check adhesiveness therebetween which was then evaluated according to the following criteria.

Very Good: The active material layer of electrode and the separator were so tightly adhered to each other that even the peeling operation caused the peeling to start from the interface between the current collector and the active material layer, thus leaving the separator attached to the active material layer of the electrode.

Good: The active material layer of electrode and the separator were sufficiently adhered to each other, but the peeling operation caused the negative electrode to be peeled from the interface between its active material layer and the separator.

Poor: The active material layer of electrode and the separator were adhered to each other, but the peeling operation caused the negative electrode to be easily peeled from the interface between its active material layer and the separator.

Bad: The peeling operation caused both of the positive electrode and the negative electrode to be easily peeled off from the interface between the active material layer and the separator.

Very bad: Not adhered.

The result is shown in Table 10.

other. In particular, the adhesiveness between the positive electrode and the separator was enhanced.

The comparison between Example 20 and Examples 21-23 showed that the addition of tris(trimethylsilyl) phosphate was able to furthermore enhance the adhesiveness between the electrode and the separator. In particular, the adhesiveness between the negative electrode and the separator was enhanced.

The comparison between Examples 23 and 24 showed that the addition of about 2% polyvinyl formal resin to the electrolyte solution was able to sufficiently enhance the adhesiveness between the electrode and the separator.

The comparison between Examples 26 to 29 showed that the decrease in polymerization degree of the polyvinyl formal resin was able to decrease the viscosity of the nonaqueous electrolyte solution.

The comparison between Example 30 and the other Examples and Comparative examples showed that the use of the negative electrode on which surface the polyvinyl formal resin film had been formed in advance, had about 2% enhanced charging/discharging efficiency and larger battery capacity as compared to the case of using a negative electrode having no resin film thereon. Further, it also showed that the adhesiveness between the electrode and the separator was enhanced.

In view of Comparative example 3, conventional gel electrolyte was never able to obtain sufficient adhesiveness even with 5% polymer component.

In view of the foregoing descriptions, it is clear that the invention gives the battery which is excellent in shape-retaining property and excellent in charging/discharging load characteristics.

The invention may be embodied in other various forms without departing from the spirit or essential characteristics

TABLE 10

| | | Viscosity of Electrolyte solution (cp) | Initial charging/ discharging efficiency (%) | 5 mA discharging capacity ratio (%) | | | Adhesiveness | |
|---|---|---|---|---|---|---|---|---|
| | | | | After initial charging | After aging-storage | After high-temp. storage | After aging-storage | After high-temp. storage |
| Example | 20 | 15.0 | 91.2 | 92 | 86 | 66 | Poor | Good |
| | 21 | 15.0 | 91.5 | 93 | 86 | 71 | Poor | Good |
| | 22 | 15.0 | 91.5 | 96 | 90 | 77 | Very good | Very good |
| | 23 | 15.0 | 91.5 | 96 | 90 | 79 | Very good | Very good |
| | 24 | 10.5 | 91.1 | 96 | 90 | 68 | Very good | Very good |
| | 25 | 21.8 | 92.0 | 95 | 89 | 75 | Very good | Very Good |
| | 26 | 28.5 | 91.5 | 95 | 89 | 77 | Very good | Very good |
| | 27 | 13.0 | 92.1 | 94 | 90 | 71 | Very good | Very good |
| | 28 | 9.5 | 92.0 | 95 | 91 | 77 | Good | Very good |
| | 29 | 6.3 | 91.4 | 93 | 86 | 66 | Poor | Good |
| | 30 | — | 92.8 | 95 | 91 | 78 | Very good | Very good |
| Comp. ex. | 3 | — | 90.6 | 92 | 87 | 67 | Bad | Bad |
| | 4 | 3.1 | 90.8 | 96 | 91 | 79 | Very bad | Very bad |

It was found that in Examples, the lithium batteries exhibited the equivalent battery characteristics to those in Comparative example 4 which was an ordinary lithium battery, and the electrode and the separator were adhered to each thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. An electrochemical device comprising at least a negative electrode, a separator, a positive electrode, and a nonaqueous electrolyte solution, wherein the negative electrode and/or positive electrode and the separator are adhered to each other with a cross-linked material of an acid denaturalized polyvinyl acetal resin.

2. The electrochemical device of claim 1, wherein a proportion of the cross-linked material relative to a total amount of the cross-linked material and the nonaqueous electrolyte solution is 3.5% by weight or less.

3. The electrochemical device of claim 1, wherein the negative electrode contains an active material which is capable of occluding and/or releasing a lithium metal and/or lithium,
  wherein the positive electrode contains an active material which can generate electromotive force of 3 V or more relative to a lithium dissolution/deposition potential, and
  wherein the nonaqueous electrolyte solution contains electrolyte selected from lithium salts.

* * * * *